United States Patent
Dontula et al.

(10) Patent No.: US 7,449,287 B1
(45) Date of Patent: Nov. 11, 2008

(54) PEARLESCENT TEXTURED IMAGING SUPPORTS

(75) Inventors: Narasimharao Dontula, Rochester, NY (US); Terry A. Heath, Omaha, NE (US); Peter G. Evans, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/022,543

(22) Filed: Jan. 30, 2008

(51) Int. Cl.
*G03C 1/93* (2006.01)

(52) U.S. Cl. .................. 430/536; 430/201; 430/950; 428/32.19; 428/32.5; 428/409; 428/523

(58) Field of Classification Search .......... 430/201, 430/536; 428/409, 523, 32.5, 32.19
See application file for complete search history.

(56) References Cited

U.S. PATENT DOCUMENTS

| | | |
|---|---|---|
| 4,216,018 A | 8/1980 | Bilofsky et al. |
| 4,269,916 A | 5/1981 | Bilofsky et al. |
| 4,288,524 A | 9/1981 | Bilofsky et al. |
| 5,340,692 A | 8/1994 | Vermeulen et al. |
| 5,466,519 A | 11/1995 | Shirakura et al. |
| 5,733,658 A | 3/1998 | Schmid et al. |
| 5,858,078 A | 1/1999 | Andes et al. |
| 5,866,282 A | 2/1999 | Bourdelais et al. |
| 5,888,681 A | 3/1999 | Gula et al. |
| 6,071,654 A | 6/2000 | Camp et al. |
| 6,071,680 A | 6/2000 | Bourdelais et al. |
| 6,497,998 B1 | 12/2002 | Dontula et al. |
| 6,544,713 B2 | 4/2003 | Aylward et al. |
| 6,544,714 B1 | 4/2003 | Bourdelais et al. |
| 6,569,593 B2 | 5/2003 | Bourdelais et al. |
| 6,596,451 B2 | 7/2003 | Dontula et al. |
| 6,599,669 B2 | 7/2003 | Aylward et al. |
| 2006/0105150 A1 | 5/2006 | Gillissen |

*Primary Examiner*—Richard Schilling

(57) ABSTRACT

The present invention relates to a support and an imaging element utilizing the support, wherein the support comprises at least one nacreous resin layer, wherein the uppermost layer comprises nacreous pigment in a polyolefin matrix polymer, and wherein the FLOP value of the imaging element, and, hence, the support, is greater than 25. Also included is a method of making the nacreous support.

25 Claims, No Drawings

PEARLESCENT TEXTURED IMAGING SUPPORTS

FIELD OF THE INVENTION

The present invention relates to novel supports for use in imaging elements.

BACKGROUND OF THE INVENTION

Prior art reflective imaging output materials such as silver halide reflective images or inkjet reflective images typically comprise imaging layers applied to a white reflective base material. The white reflective base reflects ambient light back to the observer's eye to form the image in the brain. Prior art base materials typically utilize white reflecting pigments such as $TiO_2$ or barium sulfate in a polymer matrix to form a white reflective base material. Prior art reflective photographic papers also contain white pigments in the support just below the silver halide imaging layers to obtain image whiteness and sharpness during image exposure, as the white pigment reduces the amount of exposure light energy scattered by the cellulose paper core. Details on the use of white pigments in highly loaded coextruded layers to obtain silver halide image sharpness and whiteness are recorded in U.S. Pat. No. 5,466,519, incorporated herein by reference.

It has been proposed in U.S. Pat. No. 5,866,282, incorporated herein by reference, to utilize a composite support material with laminated biaxially oriented polyolefin sheets as a photographic imaging material. In U.S. Pat. No. 5,866,282, biaxially oriented polyolefin sheets are extrusion laminated to cellulose paper to create a support for silver halide imaging layers. The biaxially oriented sheets have a microvoided layer in combination with coextruded layers that contain white pigments such as $TiO_2$ above and below the microvoided layer. The composite imaging support structure has been found to be more durable, sharper and brighter than prior art photographic paper imaging supports that use cast melt extruded polyethylene layers coated on cellulose paper.

It has been proposed in U.S. Pat. No. 6,071,680, incorporated herein by reference, to utilize a voided polyester sheet coated with light sensitive silver halide imaging layers for use as photographic output material. The voided layer improves opacity, image lightness, and image brightness compared to prior art polyethylene melt extrusion coated cellulose paper base materials. The image base also contains an integral polyolefin skin layer to facilitate imaging layer adhesion at the time of manufacture and during the processing of silver halide imaging layers.

There remains a continuing need for improvements to the appearance of imaging output materials. It has been shown that consumers, in addition to reflective output material, also prefer nacreous images. Nacreous images exhibit a pearly or nacreous luster, an iridescent play of colors, and a brilliant luster that appears in three dimensions. Nacreous appearance can be found in nature if one examines a pearl or the polished shell of Turbo marmoratus.

A nacreous photographic element with a microvoided sheet of opalescence is described in U.S. Pat. No. 5,888,681, incorporated herein by reference. Microvoided polymer sheets with microvoided polymer layer located between a cellulose paper base and developed silver halide imaging provide an image with an opalescence appearance. The nacreous appearance is created by providing multiple internal reflections in the voided layer of the polymer sheet. While the opalescence appearance is present in the image, the image suffers from a loss of image sharpness or acutance, a higher density minimum position, and a decrease in printing speed, compared to a typical photographic image formed on a white, reflecting base. It would be desirable to maintain the opalescent look of the image while improving printing speed, increasing sharpness, and decreasing density minimum. Also, while the voided polymer does provide an excellent nacreous image, the voided layer, because it is pre-fractured, is subjected to permanent deformation, thus reducing the quality of the image.

In addition to the use of white pigments in reflective consumer photographs, white pigments are also utilized in photographic display materials for diffusion of illumination light source. While the use of white pigments in display materials does provide the desired diffusion and reflection properties, the white pigments tend to change the hue angle of the color dyes in a developed photographic display image. Dye hue angle is a measure in CIElab color space of that aspect of color vision that can be related to regions of the color spectrum. For color photographic systems there is a perceptual preferred dye hue angle for the yellow, magenta, and cyan dyes. It has been found that when photographic dyes are coated on support containing white pigments, the hue angle of the developed image changes, compared to the hue angle of the dyes coated onto a transparent support. The hue angle change of photographic dyes caused by the presence of white pigments often reduces the perceived quality of the dyes compared to the dye set coated on a transparent base that is substantially free of white pigments. It would be desirable if a developed photographic dye set coated on a reflective support material had a dye hue angle that was not significantly different than the same dye set coated on a transparent support.

Nacreous pigments added to a matrix, such as paint or plastic, have been known to exhibit a nacreous appearance. The prior art use of the nacreous pigments have been for pigmenting paints, printing inks, plastics, cosmetics, and glazes for ceramics and glass. Nacreous pigments are dispersed in a matrix and then painted or printed onto a substrate. Pearl luster pigments containing titanium dioxide have been successfully employed for many years. They are constructed in accordance with the layer substrate principle, with mica being employed virtually without exception as substrate.

Mica pigments are used widely in the printing and coating industries, in cosmetology, and in polymer processing. They are distinguished by interference colors and a high luster. For the formation of extremely thin layers, however, mica pigments are not suitable, since the mica itself as a substrate for the metal-oxide layers of the pigment, has a thickness of from 200 to 1200 nm. A further disadvantage is that the thickness of the mica platelets within a certain fraction defined by the platelet size in some cases varies markedly about a mean value. Moreover, mica is a naturally occurring mineral which is contaminated by foreign ions. Highly complex, technical and time-consuming processing steps are required including, in particular, grinding and classifying.

Pearl luster pigments based on thick mica platelets and coated with metal oxides have, owing to the thickness of the edge, a marked scatter fraction, especially in the case of relatively fine particle-size distributions below 20 micrometers. As a substitute for mica, it has been proposed to use thin glass flakes which are obtained by rolling a glass melt with subsequent grinding. Interference pigments based on such materials exhibit color effects superior to those of conventional, mica-based pigments. The glass flakes are disadvantaged by having a very large mean thickness of about 10-15 micrometers and a very broad thickness distribution (typically between 4 and 20 micrometers), whereas the thickness of interference pigments is typically not more than 3 micrometers.

In U.S. Pat. No. 5,340,692, incorporated herein by reference, an imaging receiving material with nacreous pigment for producing contone images according to the silver salt diffusion process is disclosed. According to the process, contone images with an antique look can be obtained utilizing the silver salt diffusion transfer process without the need of special processing liquids using a nacreous pigment in the imaging receiving layer or located between the support and the image receiving layer. The silver halide imaging layers used are created with retained silver and, therefore, are not semitransparent. Because the nacreous pigments used are contained in the imaging receiving layer and not the silver halide imaging layer, the image formed will not have a uniform nacreous appearance, as the density of the transferred silver halide image blocks the multiple reflections from the nacreous pigments. Further, the nacreous pigments utilized are too large and in too great a concentration to be included in the silver halide imaging layer, as a rough surface would result, reducing the desired nacreous appearance of the image. The gold flakes used in the example in U.S. Pat. No. 5,340,692 are an attempt to simulate prior art black-and-white photographic "Sepiatone" appearance, produced during a post process treatment of the imaging layers. While the image in the example does have an antique appearance, the image does not have a nacreous appearance.

In U.S. Pat. No. 4,269,916, incorporated herein by reference, and related U.S. Pat. Nos. 4,288,524 and 4,216,018, both incorporated herein by reference, instant photographic products having reflective layers which comprise lamellar interference pigments are disclosed. The intended use of the lamellar pigments is to create a pleasing white reflective appearance for the base material, without the need for blue tints. It has been proposed that flat particles of metal oxides are created by coating salts with metal oxides and later dissolving the salts, leaving a thin flake of metal oxide as a substitute for spherical $TiO_2$ particles. Titanium dioxide particles typically are utilized in photographic art to create a white reflective surface for the viewing of print materials. The intent of U.S. Pat. No. 4,269,916 is to provide a white reflecting surface that does not have an angular viewing appearance and a consistent L*, thus the present materials do not exhibit a nacreous appearance. Examples in U.S. Pat. No. 4,269,916 show high reflectivity at a variety of collection angles, which is opposite of a nacreous appearance where reflectivity changes as a function of collection angle. Further, the lamellar pigments are not present in the silver halide imaging layers or in the base materials. The matrix material containing the lamellar pigments is defined to be compatible with and permeable by aqueous alkaline processing compositions. Particularly suitable matrix materials as disclosed in U.S. Pat. Nos. 4,216,018 and 4,269,916, incorporated herein by reference, are gelatin, polyvinyl alcohols and cellulosic polymeric materials such as hydroxyalkyl celluloses and carboxyalkyl celluloses.

In U.S. Pat. No. 5,858,078, incorporated herein by reference, a process for the production platelet like, substrate free $TiO_2$ pigment is disclosed for use in printing inks, plastics, cosmetics and foodstuffs. In U.S. Pat. No. 5,733,658, incorporated herein by reference, luster pigments obtainable by treating titania coated silicate based platelets from 400° C. to 900° C. with a gas mixture comprising a vaporized organic compound and ammonia are described as useful for coloring paints, inks, plastics, glasses, ceramic products, and decorative cosmetic preparations. When imaging supports are subject to variations in ambient conditions over long periods of time, the image-containing layers and resin layers tend to deteriorate into a mass of cracks which are aesthetically undesirable and which, in extreme cases, extend over the entire print completely destroying the image. All polymers are inherently prone to chemical degradation that leads to loss of mechanical properties. They undergo thermal degradation during processing such as extrusion of thin films, and photooxidative degradation with long-term exposure to light. The $TiO_2$ utilized in U.S. Pat. No. 5,858,078 and U.S. Pat. No. 5,733,658, both incorporated herein by reference, catalyzes and accelerates both thermal and photooxidative degradation. In the art of resin coating imaging papers, the melt polymers are extruded at high temperatures and are also subjected to high shear forces. These conditions may degrade the polymer, resulting in discoloration and charring, formation of polymer slugs or "gels", and formation of lines and streaks in the extruded film from degraded material deposits on die surfaces. Also, thermally degraded polymer is less robust than non-degraded polymer for long-term stability, and may thereby shorten the life of the print.

It has been shown that when imaging layers (silver halide, inkjet, flexography, laser toner, and the like) are applied to nacreous base materials, the nacreous appearance of the image is optimized when the image forming layers contain semitransparent dyes. The use of pigmented inks and dyes in the imaging layers tend to reduce the nacreous appearance of the image. In U.S. Pat. No. 6,071,654, incorporated herein by reference, silver halide imaging layers that are semitransparent are coated on a nacreous support containing a voided polymer layer. The voided polymer layers create flat platelets oriented parallel to each other. The reflection which reaches the eye is primarily specular. It arises in depth, since each transparent polymer platelet reflects some of the incident light and transmits the remainder to the next transparent platelet layer. The images in U.S. Pat. No. 6,071,654 exhibit a nacreous appearance.

U.S. Pat. No. 6,497,998, incorporated herein by reference, discloses an imaging element comprising at least one layer of oriented polyolefin and nacreous pigment. The use of nacreous pigment in an oriented polyolefin layer which is cast and stretched at temperatures between the resin's glass transition temperature and melt point is disclosed. This orientation process results in a product with nacreous appearance. Unfortunately, the process also results in a product having a rough surface, which is conventionally thought to reduce the nacreous appearance. To accentuate the nacreous appearance, the surface roughness is controlled to less than 1.2 µm using a clear polyolefin skin not containing any pigments on top of the polyolefin layer containing nacreous pigment. The cast and stretch orientation process would also result in voiding which weakens the film. The present invention discloses imaging elements created using a nacreous pigment in a resin coated polyolefin layer without a clear top skin of polyolefin, that is oriented in a melt state well above melting point and whose surface is textured and rough, with a roughness average (Ra) greater than 1.2 µm.

U.S. Pat. No. 6,544,713, incorporated herein by reference, relates to an imaging element comprising at least one layer comprising nacreous pigment and polymer. U.S. Pat. No. 6,544,713 does not discuss the use of rough surfaces to create textures on the imaging element surface to manipulate the nacreous appearance. U.S. Pat. No. 6,544,713 does not teach the use of rough surfaces having high nacreous appearance. A preferred embodiment comprises at least two layers containing nacreous pigment. The nacreous pigment may be in at least one image layer and in at least one additional resin coated layer that comprises a nacreous pigment and polymer.

U.S. Pat. No. 6,569,593, incorporated herein by reference, relates to an imaging element comprising at least one layer of oriented polyester and nacreous pigment. The present invention discusses use of nacreous pigment in a polyolefin resin, like polyethylenes or polypropylenes which is resin coated and does not undergo the biaxial orientation process. The biaxial orientation process of polymers containing inorganic pigments like nacreous pigment typically cause films to void.

U.S. Pat. No. 6,544,714, incorporated herein by reference, relates to a packaging material comprising at least one layer comprising photosensitive silver halide, at least one layer comprising nacreous pigment, and at least one layer comprising a pressure sensitive adhesive. The present invention does not discuss use of layers containing pressure sensitive adhesive layers.

U.S. Pat. No. 6,596,451, incorporated herein by reference, relates to an imaging element comprising an imaging layer, a nacreous pigment, and at least one layer comprising voids. The support of U.S. Pat. No. 6,596,451(B2) is created by a cast and stretch process. The present invention is on a non-voided support created using resin coating against chill roll surfaces of different roughness and textures. Furthermore U.S. Pat. No. 6,596,451 does not teach the impact of roughness and textures on nacreous appearance.

U.S. Pat. No. 6,599,669, incorporated herein by reference, relates to a photographic element comprising nacreous pigment. U.S. Pat. No. 6,599,669 discloses only the use of nacreous pigment in the imaging layers of the photographic element like the layers containing the silver halide emulsion, or layers that separate the light sensitive silver halide emulsion layers. The present invention discloses only the use of nacreous pigment in resin coated polyolefins (non-imaging layers), on top of which non-nacreous pigment containing silver halide emulsion layers are coated. The present invention discloses substrates having previously unknown characteristics of low gloss but high nacreous appearance.

PROBLEM TO BE SOLVED

There remains a continuing need for improvements to the appearance of imaging output materials. It has been shown that consumers, in addition to reflective output material, also prefer nacreous images. There remains a need for low cost color metallic supports for silver halide imaging elements. It would be desirable to maintain the opalescent look of the image while improving printing speed, increasing sharpness, and decreasing density minimum. It would also be desirable to have a photographic dye set coated on a reflective support material that has a dye hue angle that is not significantly different from the same dye set coated on a transparent support.

SUMMARY OF THE INVENTION

The present invention relates to an imaging element comprising at least one imaging layer and a support, wherein the support comprises at least one nacreous resin layer, wherein the uppermost layer of the support is adjacent to the at least one imaging layer and comprises nacreous pigment in a polyolefin matrix polymer, and wherein the FLOP value of the support is greater than 25. The present invention also relates to a support for an imaging element comprising at least one nacreous resin layer, wherein the uppermost layer of the support comprises nacreous pigment in a polyolefin matrix polymer, and wherein the FLOP value of the support is greater than 25, as well as a method of making a support comprising providing a base substrate; extruding a molten uppermost layer comprising nacreous pigment in a polyolefin matrix polymer; contacting said molten uppermost layer with a chill roll having a surface that has a roughness average (Ra) of 2 μm, and Rz of 11.125 μm; and removing the uppermost layer from said chill roll, wherein the FLOP value of said uppermost layer is greater than 25.

ADVANTAGEOUS EFFECT OF THE INVENTION

The present invention includes several advantages, not all of which are incorporated in a single embodiment. The present invention provides a low cost, lustrous, nacreous appearance, as well as an added three-dimensional quality to the image produced on the imaging element. The present invention provides an imaging element with a textured surface and maintains the opalescent look of the image while improving printing speed, increasing sharpness, and decreasing density minimum.

DETAILED DESCRIPTION OF THE INVENTION

Nacreous/pearlescent imaging supports have been created using pigments. Nacreous/pearlescent imaging supports have been created by extrusion coating in a low density polyethylene matrix. Nacreous/pearlescent imaging supports have been created using a two layer structure (coextrusion) as well as monolayer extrusion. The layer containing the pearlescent or nacreous pigment does not contain any other pigments, like $TiO_2$ or $CaCO_3$, and is closest to the emulsion layer (image receiving layer). The amount of nacreous pigment or coverage of nacreous pigment determines the pearlescence, which is characterized by FLOP measurements. It is conventionally well known in the trade and art that rough surfaces reduce the pearlescence and the nacreous appearance of imaging supports. Surprisingly, in the present invention, the pearlescence was enhanced based on the surface characteristics (roughness) of the chill roll surface against which the pearlescent pigment layer was extruded. Surprisingly it was found that resin extrusion coated against a chill roll surface that has a roughness average (Ra) of 2 μm, and Rz of 11.125 μm gave significantly higher FLOP values than when resin was extruded against a chill roll surface that has a roughness average (Ra) of 1.14 μm, and Rz of 7.976 μm. Furthermore, the samples created against a chill roll surface that has a roughness average (Ra) of 2 μm, and Rz of 11.125 μm gave similar or slightly higher FLOP values as resin extruded against a smooth chill roll that has a roughness average (Ra) of 0.132 μm, and Rz of 1.174 μm. This is surprising because the chill roll that has the roughest surface has the highest FLOP, so there is an unexpected interaction between surface features of chill roll and resultant FLOP. The invention also discloses that, for a given pigment loading (weight % or coverage), the layer ratios of the nacreous pigment containing layer to the non-nacreous pigment containing layer/s enhance FLOP.

The use of colorants (tints) in the emulsion layer along with an imaging support that contains pearlescent pigments but does not contain colorants in the resin layer/s is also disclosed. A mica particle that has a rutile $TiO_2$ coating and a particle size of 2-10 microns is preferred, but similar trends will be observed with other pigments.

Nacreous/pearlescent supports are most useful when combined with imaging layers to form an imaging element. Especially preferred imaging application relate to silver halide systems, as well as inkjet (swellable media), and flexographic printing of these supports.

The terms as used herein, "top", "upper", "emulsion side", and "face" mean the side or toward the side of a photographic member bearing the imaging layers. The terms "bottom", "lower side", and "back" mean the side or toward the side of the photographic member opposite from the side bearing the photosensitive imaging layers or developed image.

Nacreous appearance is a pearly, luster, iridescent, metallic sheen. The term "nacreous" refers to a pearly, pearlescent, luster, and nacreous appearance. This may include a metallic, lustrous, and somewhat iridescent effect.

The nacreous effect is the result of interference pigments that are platelet-like in their structure. These pigments tend to cause specular and diffuse reflection, and they also transmit some light. Typically these are elongated platelet-like structures of silicate-based materials such as mica, feldspar, and quartz. Pearlescent, hence, nacreous pigments may include natural pearl pigment, plate-like bismuth oxychloride crystals, basic lead carbonate, mica coated with either titanium dioxide (U.S. Pat. No. 4,040,859, incorporated herein by reference), iron oxide (U.S. Pat. No. 3,087,829, incorporated herein by reference), zirconium dioxide (U.S. Pat. No. 3,087,828, incorporated herein by reference), or other high refractive index materials.

Other optically variable pigments that are suitably used are silicon oxide coated with thin layers of aluminum (5 nm and 10 nm) or titanium dioxide, and magnesium fluoride crystals coated with chromium have also been used. These pigment structures have been highlighted in U.S. Pat. No. 3,438,796, incorporated herein by reference. New optically variable pigment structures based on coated platelet like metallic substrates have been disclosed in U.S. Pat. No. 5,364,467 and U.S. Pat. No. 5,662,738, incorporated herein by reference. U.S. Pat. No. 5,976,511, incorporated herein by reference, discloses pigments composed of barium sulfate particles and coated with zinc oxide, cerium oxide, or titanium dioxide which have a pearly luster.

In a preferred embodiment of this invention, the nacreous pigments comprise mica. Coated mica is preferred because it has a platelet structure that, when coated with metal oxides, has a nacreous appearance that provides a very appealing, unique look to an image. Furthermore, the mica may be easily dispersed and coated in a layer or layers that comprise silver halide emulsion, as well as layers that are free of or at least substantially free of silver halide emulsion. For the purpose of this invention the term "mica" refers to nacreous materials and includes mica, feldspar, quartz, silicates, modified mica, and mica that has been coated with a metal oxide, mica coated with materials that have a difference in refractive index greater than 0.2. The mica material may be translucent organic and/or inorganic materials and may have a nacreous effect when viewed from different angles. Examples of mica suitable for pearlescent pigments are muscovite, paragonite, phlogopite, biotite, and lepidolite. The mica platelets may be coated with a thin single layer or multiple layers of high refractive index inorganic oxide. The size of the mica particle also plays an important role in determining the final reflected image. The weight of the mica in the pigment usually lies between 40% and 90% and most usually in the range of 60% and 80%. If titanium dioxide is used as the coating and its coating thickness is increased, then an iridescence effect (color) is observed.

Special metal oxide coatings are applied to mica particles in very thin layers. Metal oxide coatings that may be used include titanium, iron, chromium, barium, aluminum, zinc, zirconium, bismuth vanadate, nickel titanate, chromium titanate, lead, and others. The most preferred metal oxide is titanium because of its superior whiteness. Typically it is important to control the thickness of the metal oxide coating to less than 120 nanometers to achieve a blue-white appearance.

With nacreous pigments used in imaging application, it may be desirable to have non-uniform platelet thickness and small particles to create a white nacreous appearance. In general, the lustrous pigments referred to in this invention are pigments that consist of flat mica platelets coated with titanium dioxide or other metal oxides. They are irregular in shape and may vary in thickness from 0.1 to 0.5 micrometers, although some individual particles may be thicker. The particles may have a length of up to 500 micrometers.

For use in a photographic element it is desirable to have a smooth surface. To achieve this, a small particle is best but the layer thickness of the binder polymer in which the pigments are suspended may also be increased as well as applying clear overcoats. Larger particles are desirable when a bold effect with visual impact is desired. The nacreous effect can be changed by adjusting the particle size, metal oxide coating thickness and type, as well as the concentration of the pigment. In general, low pigmentation levels are better at producing a three-dimensional effect. When a more metallic sheen is desired, higher pigmentation levels are best.

In some applications it may be desirable to have a nacreous pigment that is also conductive. This has some unique advantages in the area of photography that uses light sensitive layers. Static accumulation and discharge can result in a fogged layer. Being able to provide a conductive path that helps to prevent the charge from building up is an important element for imaging media. This not only helps prevent light fogging of light sensitive layer, but also allows sheets to slide over each other and various equipment parts without static buildup or cling of one sheet to another. This type of pigment is also a means of adding conductivity to the emulsion side of a photographic element. Conductive nacreous pigments consist of an inner core of platelet mica that is coated with materials such as $TiO_2$, $SiO_2$ and further coated with an outer layer of dense layer of conductive, inorganic mixed metal oxide. A typical material is antimony-doped tin dioxide. The elongated particles of mica are useful in providing a conductive pathway when particles are touching. In one embodiment of this invention, the nacreous pigment further comprises electrical resistant of less than $10^{13}$ log ohms per square. Electrical resistance less than $10^{13}$ is desirable to prevent static buildup and discharge that can cause the light sensitive layer to fog.

The dimensions of pearlescent pigments used in this invention may be between 0.5 µm and 400 µm and preferably between 1 µm and 100 µm, since particles greater than 100 µm progressively get rougher. Excessive roughness on the surface tends to shut down the nacreous appearance. The thickness of the pigment is preferably between 0.1 µm and 0.6 µm and more preferably between 0.2 µm and 0.4 µm. Particles less than 5 µm or less than 0.2 µm typically do not have sufficiently higher nacreous appearance, while particles greater than 400 µm in length or 0.6 µm in width typically are very large and tend to create roughness which starts to shut down the nacreous effect.

The nacreous pigments may comprise between 0.5 and 3000 mg/m² of the photographic element. Nacreous pigment levels below 0.5 mg/m² are difficult to detect and generally do not have a nacreous impact. Nacreous pigment levels at 1000 mg/m² require appropriate processing conditions using resin coating without compromising on their impact in appearance.

In a preferred embodiment of this invention, the nacreous pigments are present in the amount between 500 and 2500 mg/m². To enable the use of nacreous pigments in these levels, there is a need to increase overall thickness of the resin layer containing the nacreous pigment. Below 500 mg/m$^2$, the nacreous appearance is subtle, while levels above 2500 mg/m$^2$ do not have a significantly improved nacreous appearance. Higher levels in the preferred range tend to have a stronger nacreous appearance which is desirable in applications for display or youth markets, where a different look is valued. In a preferred embodiment, the nacreous pigment should comprise between 0.1 to 15% by weight of the polyolefin resin. Levels below 0.1% have minimal nacreous appearance, while levels above 15% cause excessive stacking of the platelets which tends to interfere with the nacreous appearance. It is preferred to have the nacreous pigments as the only pigment in a substantially clear polymer. The inclusion of other solid particles tends to cause more light scattering, reducing the nacreous effect.

Coatings may exhibit differences in degree of brightness and color and differences in brilliance depending on the angle of incidence of the incoming light and the angle of observation. A characteristic property of a nacreous appearance is an angular dependence of viewing angle. These differential light reflection phenomena are called FLOP effects. This angular dependence of viewing angle is characterized by a spectrophotogoniometer and is reported as FLOP value.

A test method, as described in the Examples, is used to measure the nacreous quality of materials of interest to determine a FLOP value. 45-degree incident light is collected at 10, 45, and 110 degrees from the specular reflection angle. The spectrophotometric output, e.g., CIE L* (L1*, L2*, L3* respectively) is used as follows:

$$FLOP=15(L1*-L3*)^{1.11}/L2*^{0.86}$$

whereby FLOP values less than 10 have no nacreous appearance and FLOP values greater than 10 are indicative of a nacrescent appearance.

This angular viewing dependency of the media and the inherent randomness of the structure will result in errors "reading out" the dye formed due to the variability of the media at any one collection angle. These highly specular and translucent materials will reflect some light in angular dependent non-specular directions as well. It has been found that although incident light and collection at 0/45 will allow for a prediction of density minimum versus FLOP, these values are no longer predictive, as density increases from density minimum to density maximum as color dye forming layers are added to the media. In a preferred embodiment of the present invention, the FLOP values of the imaging element and associated support are greater than 25 and the surface has a roughness or texture associated with it. In another preferred embodiment, the FLOP values are greater than 25 and the surface is glossy. Most preferable FLOP values are greater than 30.

Interference effect factors are further disclosed in "Pigment Handbook, Volume III, Characterization and Physical Relationships",—Pg 357-359 Editor by T. C. Patton, John Wiley & Sons (1973). Factors affecting reflectance properties are further disclosed in R. W. Fleming, R. O. Dror, and E. H. Adelson, "Real World Illumination and the perception of surface reflectance properties" in "Journal of Vision", 347-368 (2003), as well as at website http://www.glenbrook.k12.is.us/gbssci/phys/Class/refln/u1311d.html. The importance of surface appearance on gloss is disclosed in Kai-Erik Peiponen and Mikko Juuti, "Statistical parameters for gloss evaluation", Applied Physics Letters, 88, 071104 (2006). These documents are all incorporated herein by reference.

The nacreous particles can be dispersed in most carrying (binder polymer) media. Since the particles are substantially transparent, the use of a carrying media that is also transparent provides the maximum effect. If a more translucent carrying media is used, more nacreous pigment may be needed to achieve the same level of nacreous appearance. For the purpose of this invention, the term polymer, unless otherwise defined, refers to a melt extrudable resin, such as polyolefins, polyesters and their copolymers and combinations thereof. The preferred resins are polyolefins and their copolymers.

Polyolefins are desired because they are relatively inexpensive, and nacreous pigments are also readily dispersed in polyolefins and extrusion coated. Polyolefin and in particular polyethylene is preferred to be in contact with a photographic emulsion to enhance adhesion. In a preferred embodiment, the imaging element of at least one layer comprising nacreous pigment and polymer further comprises a polymer selected from the group consisting of polyolefin, polyester, polycarbonate, polyamide and copolymer derivatives thereof as well as blends.

The extrusion of polyolefins containing nacreous pigments may be done in one or more layers. A resin layer containing opacifying agents may also be coextruded below the resin layer containing nacreous pigments. Typical opacifying agents or white pigments include $TiO_2$, $BaSO_4$, $CaCO_3$, talcs, clays, ZnO, ZnS and other pigments known in the art. Since nacreous particles tend to be relatively large, the use of an extruded layer provides a means to control the ratio of polymer layer thickness to the longest dimension of the nacreous particle.

In a preferred embodiment, in which an imaging element is resin coated with nacreous pigments and polymer, the resin polymer layer should otherwise be substantially free of other pigments. That is the carrying polymer should be clear. Light absorbing and reflecting white pigments in the same layer or in layers above the nacreous pigment will markedly reduce or shutdown the nacreous appearance. The coverage of the resin layer containing the nacreous pigment is 12,000 mg/m$^2$ to 35,000 mg/m$^2$. For monolayers, the preferred coverage of the nacreous pigment is 17,000 mg/m$^2$ to 35,000 mg/m$^2$.

In other embodiments, the polymer resin coating (front side coating) positioned under the light sensitive layer or imaging layer may contain other materials, coloring pigments, optical brighteners and, if necessary, other additives such as antistatic agents, dispersing agents for the pigment, etc. The resin coated layer may also be one or more layers preferably below the nacreous particle containing layer(s). The pigment containing polyolefin-coating material can be applied onto one or both sides of the paper. It preferably consists of a polyolefin (80-95% by weight), a titanium dioxide (20-5% by weight) and 0.05-20% by weight of an alkaline earth carbonate or oxide. In coextruded structures with nacreous pigment containing layer/s, the amount of opacifying agent like $TiO_2$ in the other polyolefin layer/s can be reduced. Also, if a sufficient amount of nacreous pigment is used in a thick resin layer, the layer containing opacifying agent may be eliminated.

In conventional photographic resin coated paper, titanium dioxide is used because of its high refractive index, which gives excellent optical properties at a reasonable cost. The surface of the $TiO_2$ can be treated with an inorganic compound such as aluminum hydroxide, alumina with a fluoride compound or fluoride ions, silica with a fluoride compound or fluoride ion, silicon hydroxide, silicon dioxide, boron oxide, boria-modified silica (as described in U.S. Pat. No. 4,781,761), phosphates, zinc oxide, $ZrO_2$, etc. and with organic treatments such as polyhydric alcohol, polyhydric amine, metal soap, alkyl titanate, polysiloxanes, silanes, etc.

Nacreous/pearlescent supports of the present invention may be monolayer supports, that is, exactly one resin coated layer, as well as multilayer supports. Multilayer supports typically comprise at least one resin coated layer on a base support or substrate. In the present invention, the top or outermost resin coated layer of a multilayer support is the nacreous pearlescent layer. The nacreous layer may be located on at least the imaging side of the support, and may also be located on the non-image side of the support.

Any base substrate may be used in this invention. This includes but is not limited to resin coated base paper and in particular photographic resin coated base paper, polyester, biaxially oriented polymer sheets laminated to paper, polyester or other suitable polymer sheet, paper, polymer coated paper, synthetic paper and others.

Conventional resin coated photographic paper support materials generally consist of a base paper with polymer resin coatings on both sides. The polymer resin coatings on the base paper can consist of a polyolefin, such as polyethylene or polypropylene and are generally applied to the paper by means of an extrusion coating process. This may be either a single layer of polymer or multiple coextruded layers. The white reflective base provides an excellent surface and background while viewing prints. In particular, it is desirable to have a white reflective base that has an L* of greater than 92. L* greater than 92 are desirable because they provide good contrast to the image and are pleasing to the viewer. Highly reflective whites are highly desirable from a final consumer standpoint. L* or lightness and opacity were measured for using a Spectrogard spectrophotometer, CIE system, using illuminant D6500. In a further embodiment of this invention it is desirable to have a base with a surface roughness average (Ra) of greater than 0.8 μm and Rz of greater than 7 μm. Furthermore it is preferred the bases with surface characteristics which lead to roughness and texture are created by a patterned chill roll used in a resin coating process or could be an embossing process later on. The chill roll or embosser used will also have certain roughness characteristics Ra and Rz to result in rough and textured substrate and a rough and textured imaging element.

In a preferred embodiment, the photographic element has a b* less than 10. A b* less than 10 is desirable for photographic print material because of the customer traditional expectation of a white appearing print. Furthermore, b* less than 10 provides excellent contrast to other colors. There are many color shades of white. Blue whites are desirable to make the whites look whiter, while less blue or more yellow whites are desirable for warmer tones images. Other color tints may be used for other shades of white, while optical brighteners may be used in conjunction with the nacreous pigments to make the whites more blue appearing. Nacreous pigments with colors other than white may be used to create special effects or color schemes.

Photographic and imaging elements are characterized by gloss which in turn is affected by surface roughness. An element's surface roughness is typically characterized by stylus containing instruments like a perthometer, Federal profiler or interferometry. The surface characteristics obtained from these measurements are roughness parameters like roughness average (Ra). This is also known as arithmetic average (AA), Center Line Average (CLA), Arithmetical Mean Deviation of the Profile.

Ra is the area between the roughness profile and its mean line, or the integral of the absolute value of the roughness profile height over the evaluation length:

$$R_a = \frac{1}{L}\int_0^L |r(x)|\,dx$$

When evaluated from digital data, the integral is normally approximated by a trapezoidal rule:

$$R_a = \frac{1}{N}\sum_{n=1}^{N} |r_n|$$

Furthermore, from the raw data, roughness characteristics like Rz can be obtained which is the sum of the height of the highest peak plus the lowest valley depth within a sampling length. Also from the raw data, the number of peaks per unit length can be determined. This is called as peak count (Pc). For the purpose of calculating Pc a "peak" is defined relative to an upper and lower threshold. Usually this is a single number, the "peak count threshold", the distance from a lower threshold up to an upper threshold, centered on the mean line. A peak must cross above the upper threshold and below the lower threshold in order to be counted. Peak count is the number of peaks in the evaluation length divided by the evaluation length which can be a centimeter or inch. In a preferred embodiment, the support for the imaging element has number of peaks/cm greater than 0.25 micron but less than 1 micron in the range of from 30 to 70. This support may also have an Ra less than 2 microns, and an Rz less than 11 microns.

Another spatial parameter that is usefll in characterizing surfaces is Sm which stands for the average spacing between two positive meanline crossings. For a given trace length, the distance between two consecutive meanline crossings are determined and the average value is reported. The roughness parameters are determined as per ASME B46.1 Standard-2002 (classification and designation of surface qualities).

Surprisingly, imaging element surfaces may be rough (as characterized by high Ra and Rz), but have high nacreous appearance or FLOP values greater than 25. A preferred embodiment is a photographic element having a Ra greater than 0.8 μm (so low gloss) and Rz greater than 7 μm which has Sm greater than 150 μm, preferably, greater than 290 μm or even 300 μm. Experimental evidence indicates that an imaging element with an uppermost layer that has a surface roughness average Ra of greater than 1.5 μm and a roughness characteristic Rz of greater than 8.4 μm provides FLOP values consistently greater than 25, preferably, greater than 30. This element preferably has an uppermost layer with a spatial surface characterizing parameter Sm of greater than 290 μm.

Used herein, the phrase 'imaging element' comprises an imaging support along with at least one image receiving layer as applicable to multiple techniques governing the transfer of an image onto the imaging element. Such techniques include thermal dye transfer, electrophotographic printing, or inkjet printing, as well as a support for photographic silver halide images. As used herein, the phrase "photographic element" is a material that utilizes photosensitive silver halide in the formation of images. An embodiment of this invention may contain silver halide, swellable inkjet receiving layers, thermal dye receiving layers or electrophotographic layers or combinations thereof. The elements may include those intended for reflection viewing, which usually have an opaque support, and those intended for viewing by transmitted light, which usually have a transparent support.

One embodiment is directed to a method of making a dye-receiving element for thermal dye transfer comprising a support and on one side thereof a dye image-receiving layer, wherein between the dye-image receiving layer and the support is a tie layer that was made by coextrusion with at least the dye-receiving layer, wherein the composition of the tie layer comprises a polyolefin-containing binder and a thermoplastic antistatic polymer having preselected antistat, adhesive, and viscoelastic properties as described above. The total thickness of the dye-receiving layer in the final product is less than 10 microns, preferably 1 to 5 microns thick; the thickness of the tie layer is also preferably not more than 10 microns, preferably 1 to 5 microns thick.

The image receiving layer of the present invention may comprise a thermal image receiving layer, preferably as disclosed in U.S. patent application Ser. Nos. 10/614,379, published as 2005/0009699, and 11/406,178, published as 2006/0189482, both incorporated herein by reference. The thermal ink or dye image-receiving or recording layer of the receiving or recording elements used with the invention may comprise, for example, a polycarbonate, a polyurethane, a polyester, polyvinyl chloride, poly(styrene-co-acrylonitrile), poly(caprolactone), or mixtures thereof. The ink or dye image-receiving or recording layer may be present in any amount that may be effective for the intended purpose. An overcoat layer may be further coated over the ink or dye-receiving or recording layer, such as described in U.S. Pat. No. 4,775,657, incorporated herein by reference.

Ink or dye-donor elements that may be used with the ink or dye-receiving or recording element used with the invention conventionally comprise a support having thereon an ink or dye containing layer.

Any ink or dye may be used in the ink or dye-donor employed in the invention, provided it is transferable to the ink or dye-receiving or recording layer by the action of heat. Ink or dye donors applicable for use in the present invention are described, for example, in U.S. Pat. Nos. 4,916,112; 4,927,803; and 5,023,228, all incorporated herein by reference. As noted above, ink or dye-donor elements may be used to form an ink or dye transfer image. Such a process comprises image-wise-heating an ink or dye-donor element and transferring an ink or dye image to an ink or dye-receiving or recording element as described above to form the ink or dye transfer image. The thermal ink or dye transfer method of printing, an ink or dye donor element may be employed which comprises a poly(ethylene terephthalate) support coated with sequential repeating areas of cyan, magenta, and yellow ink or dye, and the ink or dye transfer steps may be sequentially performed for each color to obtain a three-color ink or dye transfer image. When the process is only performed for a single color, then a monochrome ink or dye transfer image may be obtained.

Dye-donor elements that may be used with the dye-receiving element conventionally comprise a support having thereon a dye containing layer.

Any dye can be used in the dye layer of the dye-donor element provided it is transferable to the dye-receiving layer by the action of heat. Especially good results have been obtained with sublimable dyes.

A preferred embodiment utilizes a magenta dye, alone or in combination, comprising at least a first magenta dye of the following structure I:

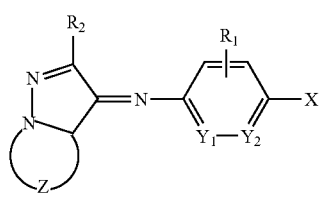

(I)

wherein X represents a $NR_3R_4$ group or a hydroxyl group, wherein $R_3$ and $R_4$ may be same or different and are independently selected from an alkyl, alkenyl, aryl, aralkyl, or cycloalkyl group; $Y_1$ and $Y_2$ each independently are selected from a carbon atom or a nitrogen atom, provided that one of $Y_1$ and $Y_2$ is a nitrogen atom; Z represents an atomic group necessary to form a 5- or 6-membered nitrogen-containing heterocyclic ring which may be condensed with another ring; and $R_1$ and $R_2$ are each independently selected from a hydrogen atom, halogen atom, alkyl, alkenyl, alkoxy, alkylamino, acetamido, sulfonamide, aryl, aralkyl, or cycloalkyl group;

and optionally, a second magenta dye of the structure II:

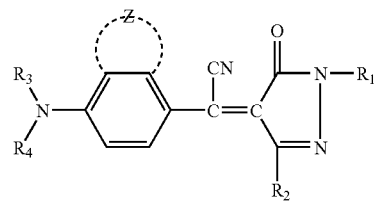

(II)

Wherein $R_1$ represents an alkyl group having from 1 to 10 carbon atoms, a cycloalkyl group having from 5 to 7 carbon atoms, or an aryl group having from 6 to 10 carbon atoms; $R_2$ represents an alkoxy group having from 1 to 10 carbon atoms, an aryloxy group having from 6 to 10 carbon atoms, naphthoxy, $NHR_5$, $NR_5$, or $R_6$; $R_3$ and $R_4$ are each independently $R_1$, or either or both of $R_3$ and $R_4$ can be joined to the carbon atom of the aromatic ring at a position ortho to the position of attachment of the anilino nitrogen to form a 5- or 6-membered ring, or $R_3$ and $R_4$ can be joined together to form a 5- or 6-membered heterocyclic ring with the nitrogen to which they are attached; $R_5$ and $R_6$ each independently represents an alkyl group having from 1 to 10 carbon atoms, a cycloalkyl group having from 5 to 7 carbon atoms, or an aryl group having from 6 to 10 carbon atoms, or $R_5$ and $R_6$ may be joined together to form, along with the nitrogen to which they are attached, a 5- or 6-membered heterocyclic ring; and Z represents hydrogen or the atoms necessary to complete a 5- or 6-membered ring. Additional magenta dyes can be added to the composition.

One or more dyes of structure I can be included in a total amount of from 10 to 90% by weight of the composition, for example, from 15 to 90% by weight, or from 25 to 75% by weight of the composition. Structure r is as follows:

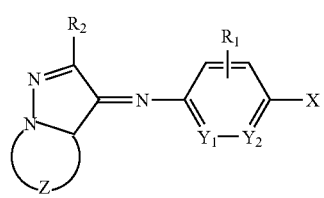

(I)

wherein X represents a $NR_3R_4$ group or a hydroxyl group, wherein $R_3$ and $R_4$ may be same or different and are independently selected from an alkyl, alkenyl, aryl, aralkyl, or cycloalkyl group; $Y_1$ and $Y_2$ each independently are selected from a carbon atom or a nitrogen atom, provided that one of $Y_1$ and $Y_2$ is a nitrogen atom; Z represents an atomic group necessary to form a 5- or 6-membered nitrogen-containing heterocyclic ring which may be condensed with another ring; and $R_1$ and $R_2$ are each independently selected from a hydrogen atom, halogen atom, alkyl, alkenyl, alkoxy, alkylamino, acetamido, sulfonamide, aryl, aralkyl, or cycloalkyl group. According to certain embodiments, Structure I, $Y_1$ can be a carbon atom, $Y_2$ can be a nitrogen atom, X can be an $NR_3R_4$ group wherein $R_3$ and $R_4$ may be same or different alkyl, Z can be a 5-membered nitrogen-containing heterocyclic ring, $R_1$ can be a hydrogen or alkyl group, and $R_2$ can be an alkyl group.

The dye of structure I can be as follows:

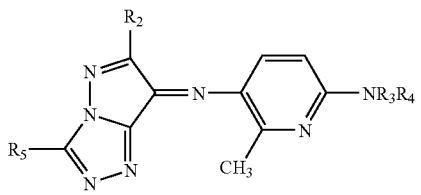
(Ia)

wherein $R_3$ and $R_4$ can be the same or different and are independently selected from an alkyl and an alkenyl; $R_2$ can be a $C_{1-6}$ alkyl; and $R_5$ can be a $C_{1-10}$ alkyl group, a $C_{5-7}$ cycloalkyl group, or a $C_{6-10}$ aryl group. According to certain embodiments, the dye of structure I can be as follows:

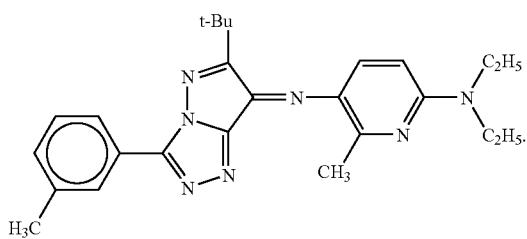
(Ib)

Methods of forming the dye of structures I, Ia and Ib are known in the art and can be found, for example, in U.S. Pats. Nos. 5,476,943 and 5,532,202, incorporated herein by reference.

A magenta dye of structure II can be included in the composition. One or more dyes of structure II can be included in a total amount of from 10 to 90% by weight of the composition, for example, from 10 to 85% by weight, or from 25 to 75% by weight of the composition. The magenta dye of structure II has the following formula:

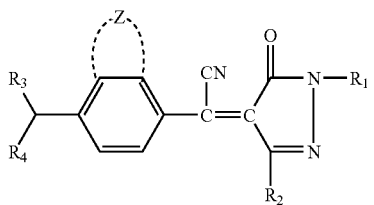
(II)

wherein $R_1$ represents an alkyl group having from 1 to 10 carbon atoms, a cycloalkyl group having from 5 to 7 carbon atoms, or an aryl group having from 6 to 10 carbon atoms; $R_2$ represents an alkoxy group having from 1 to 10 carbon atoms, an aryloxy group having from 6 to 10 carbon atoms, naphthoxy, $NHR_5$, $NR_5$, or $R_6$; $R_3$ and $R_4$ are each independently $R_1$, or either or both of $R_3$ and $R_4$ can be joined to the carbon atom of the aromatic ring at a position ortho to the position of attachment of the anilino nitrogen to form a 5- or 6-membered ring, or $R_3$ and $R_4$ can be joined together to form a 5- or 6-membered heterocyclic ring with the nitrogen to which they are attached; $R_5$ and $R_6$ each independently represents an alkyl group having from 1 to 10 carbon atoms, a cycloalkyl group having from 5 to 7 carbon atoms, or an aryl group having from 6 to 10 carbon atoms, or $R_5$ and $R_6$ may be joined together to form, along with the nitrogen to which they are attached, a 5- or 6-membered heterocyclic ring; and Z represents hydrogen or the atoms necessary to complete a 5- or 6-membered ring.

According to certain embodiments, in structure II, $R_1$ can be phenyl or methyl; $R_3$ and $R_4$ can each independently be selected from methyl or ethyl; and $R_2$ can be $NR_5R_6$, wherein each of $R_5$ and $R_6$ is independently selected from methyl or ethyl. According to certain embodiments, structure II can be as follows:

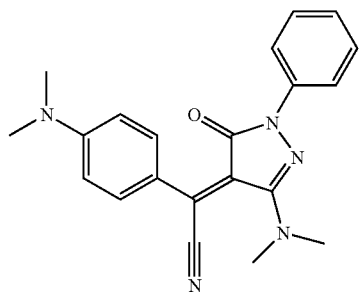
(IIa)

The magenta dye combination can be a combination of structure Ib and structure IIa.

Additional magenta dyes as known in the art can be added to the magenta dye combination including magenta dyes of structures I and II. For example, known magenta dyes include MS Red G (Disperse Red 60, manufactured by Mitsui Toatsu Chemicals, Inc.), Macrolex Violet R (Disperse Violet 26, manufactured by Bayer), and dyes of Structures III and IV shown below. Exemplary additional dyes can include dyes of structure IIIa, IVa, and IVb below, or combinations thereof.

Dyes of structure III are as follows:

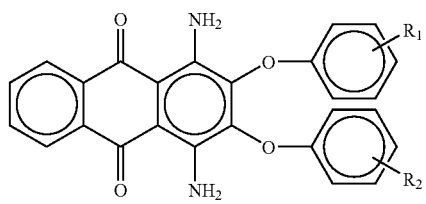
(III)

wherein $R_1$ and $R_2$ are each independently selected from hydrogen, hydroxyl, halogen, $C_{1-4}$ alkyl, or $C_{1-4}$ alkoxy. According to certain embodiments, $R_1$ and $R_2$ can be hydrogen, producing the dye of structure IIIa:

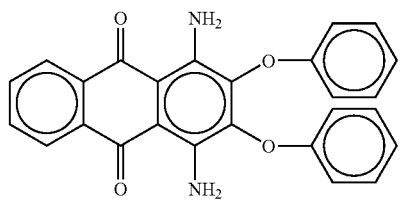
(IIIa)

Dyes of structure IV are as follows:

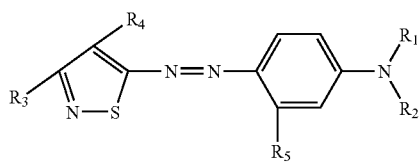
(IV)

wherein $R_1$ and $R_2$ are each independently hydrogen, $C_{1-6}$ alkyl or allyl, $C_{5-7}$ cycloalkyl, $C_{5-10}$ aryl, or $R_1$ and $R_2$ can be taken together to form a 5- or 6-membered heterocyclic ring which can include the nitrogen to which $R_1$ or $R_2$ is attached, and either carbon atom ortho to the carbon attached to the nitrogen atom; $R_3$ is a hydrogen, $C_{1-6}$ alkyl, $C_{5-10}$ aryl, alkylthio, or halogen; $R_4$ is cyano, thiocyanato, alkylthio, or alkoxycarbonyl; and $R_5$ is a $C_{1-6}$ alkyl, a $C_{5-10}$ aryl, or NHA, where A is an acyl or sulfonyl radical. Exemplary dyes of structure IV include:

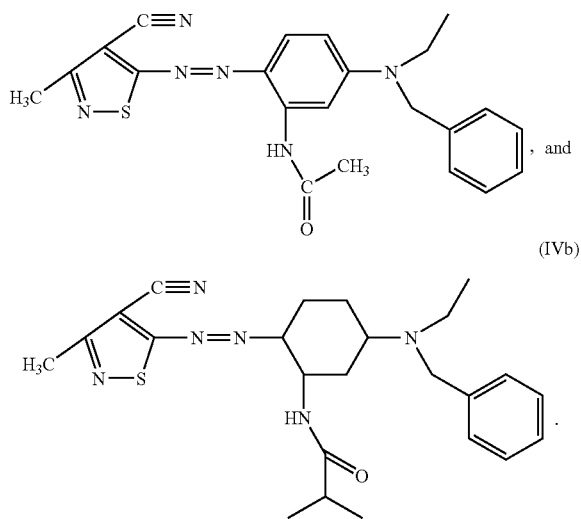

The magenta dye combinations as described herein can be used in a dye-donor layer of a thermal dye-donor element to form images by thermal printing. The dye-donor layer can include the magenta dye combination alone, or multiple colored areas (patches) containing dyes suitable for thermal printing. As used herein, a "dye" can be one or more dye, pigment, colorant, or a combination thereof, and can optionally be in a binder or carrier as known to practitioners in the art. For example, the dye layer can include the magenta dye combination and further comprise a yellow dye-donor patch comprising at least one bis-pyrazolone-methine dye and at least one other pyrazolone-methine dye, and a cyan dye-donor patch comprising at least one indoaniline cyan dye Any dye transferable by heat can be used in the dye-donor layer of the dye-donor element. The dye can be selected by taking into consideration hue, lightfastness, and solubility of the dye in the dye donor layer binder and the dye image receiving layer binder. Suitable magenta dye combinations are discussed above.

Examples of sublimable dyes include anthraquinone dyes, e.g., Sumikalon Violet RS® (Sumitomo Chemical Co., Ltd.), Dianix Fast Violet 3R FS® (Mitsubishi Chemical Industries, Ltd.), and Kayalon Polyol Brilliant Blue N BGM® and KST Black 146® (Nippon Kayaku Co., Ltd.); azo dyes such as Kayalon Polyol Brilliant Blue BM®, Kayalon Polyol Dark Blue 2BM®, and KST Black KR® (Nippon Kayaku Co., Ltd.), Sumickaron Diazo Black 5G® (Sumitomo Chemical Co., Ltd.), and Miktazol Black SGHO (Mitsui Toatsu Chemicals, Inc.); direct dyes such as Direct Dark Green B® (Mitsubishi Chemical Industries, Ltd.) and Direct Brown M® and Direct Fast Black D® (Nippon Kayaku Co. Ltd.); acid dyes such as Kayanol Milling Cyanine 5R® Nippon Kayaku Co. Ltd.); basic dyes such as Sumicacryl Blue 6G® (Sumitomo Chemical Co., Ltd.), and Aizen Malachite Green® (Hodogaya Chemical Co., Ltd.); or any of the dyes disclosed in U.S. Pat. No. 4,541,830, the disclosure of which is hereby incorporated by reference. The above dyes may be employed singly or in combination to obtain a monochrome. The dyes may be used at a coverage of from about 0.05 to about 1 g/m² and are preferably hydrophobic.

Examples of further suitable dyes, including further magenta, yellow, and cyan dyes, can include, but are not limited to, diarylmethane dyes; triarylmethane dyes; thiazole dyes, such as 5-arylisothiazole azo dyes; methine dyes such as merocyanine dyes, for example, aminopyrazolone merocyanine dyes; azomethine dyes such as indoaniline, acetophenoneazomethine, pyrazoloazomethine, imidazoleazomethine, imidazoazomethine, pyridoneazomethine, and tricyanopropene azomethine dyes; xanthene dyes; oxazine dyes; cyanomethylene dyes such as dicyanostyrene and tricyanostyrene dyes; thiazine dyes; azine dyes; acridine dyes; azo dyes such as benzeneazo, pyridoneazo, thiopheneazo, isothiazoleazo, pyrroleazo, pyrraleazo, imidazoleazo, thiadiazoleazo, triazoleazo, and disazo dyes; arylidene dyes such as alpha-cyano arylidene pyrazolone and aminopyrazolone arylidene dyes; spiropyran dyes; indolinospiropyran dyes; fluoran dyes; rhodaminelactam dyes; naphthoquinone dyes, such as 2-carbamoyl-4-[N-(p-substituted aminoaryl)imino]-1,4-naphthaquinone; anthraquinone dyes; and quinophthalone dyes. Specific examples of dyes usable herein can include: C.I. (color index) Disperse Yellow 51, 3, 54, 79, 60, 23, 7, and 141; C.I. Disperse Blue 24, 56, 14, 301, 334, 165, 19, 72, 87, 287, 154, 26, and 354; C.I. Disperse Red 135, 146, 59, 1, 73, 60, and 167; C.I. Disperse Orange 149; C.I. Disperse Violet 4, 13, 36, 56, and 31; C.I. Disperse Yellow 56, 14, 16, 29, and 231; C.I. Solvent Blue 70, 35, 36, 50, 49, 111, 105, 97, and 11; C.I. Solvent Red 135, 81, 18, 25, 19, 23, 24, 143, 146, and 182; C.I. Solvent Violet 13; C.I. Solvent Black 3; and C.I. Solvent Green 3.

Further examples of sublimable or diffusible dyes that can be used include anthraquinone dyes, such as Sumikalon Violet RS® (product of Sumitomo Chemical Co., Ltd.), Dianix Fast Violet 3R-FS® (product of Mitsubishi Chemical Corporation.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumickaron Diazo Black 5G® product of Sumitomo Chemical Co., Ltd.), and Miktazol Black 5 GH® (product of Mitsui Toatsu Chemicals, Inc.); direct dyes such as Direct Dark Green B® product of Mitsubishi Chemical Corporation) and Direct Brown M® and Direct Fast Black D® (products of Nippon Kayaku Co. Ltd.); acid dyes such as Kayanol Milling Cyanine 5R® (product of Nippon Kayaku Co. Ltd.); and basic dyes such as Sumicacryl Blue 6G® (product of Sumitomo Chemical Co., Ltd.), and Aizen Malachite Green® (product of Hodogaya Chemical Co., Ltd.).

Another preferred embodiment utilizes a cyan dye, alone or in combination, comprising at least a first cyan dye of the following structure XX:

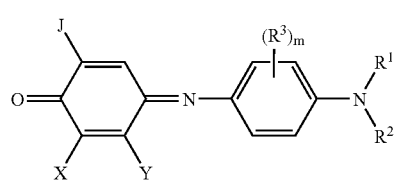

wherein: $R^1$ and $R^2$ each independently represents hydrogen; an alkyl group having from 1 to about 6 carbon atoms; a cycloalkyl group having from about 5 to about 7 carbon atoms; allyl; or such alkyl, cycloalkyl or allyl groups substituted with one or more groups such as alkyl, aryl, alkoxy, aryloxy, amino, halogen, nitro, cyano, thiocyano, hydroxy, acyloxy, acyl, alkoxycarbonyl, aminocarbonyl, alkoxycarbonyloxy, carbamoyloxy, acylamido, ureido, imido, alkylsulfonyl, arylsulfonyl, alkylsulfonamido, arylsulfonamido, alkylthio, arylthio, trifluoromethyl, etc., e.g., methyl, ethyl, propyl, isopropyl, butyl, pentyl, hexyl, methoxyethyl, benzyl, 2-methanesulfonamidoethyl, 2-hydroxyethyl, 2-cyanoethyl, methoxycarbonylmethyl, cyclohexyl, cyclopentyl, phenyl, pyridyl, naphthyl, thienyl, pyrazolyl, p-tolyl, p-chlorophenyl, m-(N-methyl-sulfamoyl)phenylmethyl, methylthio, butylthio, benzylthio, methanesulfonyl, pentanesulfonyl, methoxy, ethoxy, 2-methane-sulfonamidoethyl, 2-hydroxyethyl, 2-cyanoethyl, methoxy-carbonyl-methyl, imidazolyl, naphthyloxy, furyl, p-tolylsulfonyl, p-chlorophenylthio, m-(N-methyl sulfamoyl)phenoxy, ethoxycarbonyl, methoxyethoxycarbonyl, phenoxycarbonyl, acetyl, benzoyl, N,N-dimethylcarbamoyl, dimethylamino, morpholino, anilino, pyrrolidino etc.; each $R^3$ independently represents hydrogen, substituted or unsubstituted alkyl, cycloalkyl or allyl as described above for $R^1$ and $R^2$; alkoxy, aryloxy, halogen, thiocyano, acylamido, ureido, alkylsulfonamido, arylsulfonamido, alkylthio, arylthio or trifluoromethyl; or any two of $R^3$ may be combined together to form a 5- or 6-membered carbocyclic or heterocyclic ring; or one or two of $R^3$ may be combined with either or both of $R^1$ and $R^2$ to complete a 5- to 7-membered ring; m is an integer of from 0 to 4; X represents hydrogen, halogen or may be combined together with Y to represent the atoms necessary to complete a 6-membered aromatic ring, thus forming a fused bicyclic quinoneimine, such as a naphthoquinoneimine; J represents $NHCOR^4$, $NHCO_2R^4$, $NHCONHR^4$ or $NHSO_2R^4$; and with the proviso that when X is combined with Y, then J represents $CONHR^4$, $SO_2NHR^4$, CN, $SO_2R^4$ or SCN, in which case, however, $R^4$ cannot be hydrogen; $R^4$ is the same as $R^1$ or represents an aryl group having from about 6 to about 10 carbon atoms; a hetaryl group having from about 5 to about 10 atoms; or such aryl or hetaryl groups substituted with one or more groups such as are listed above for $R^1$ and $R^2$; and Y is the same as $R^4$, or acylamino or may be combined together with X as described above.

Other suitable cyan dyes can include Kayaset Blue 714 (Solvent Blue 63, manufactured by Nippon Kayaku Co., Ltd.), Phorone Brilliant Blue S-R (Disperse Blue 354, manufactured by Sandoz K.K.), Solvent Blue 63, and cyan dyes of the structures

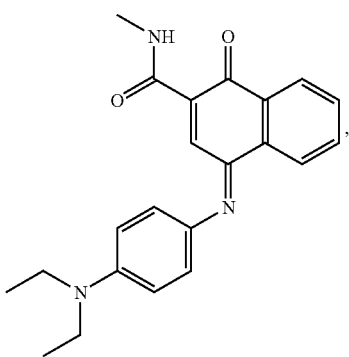

,

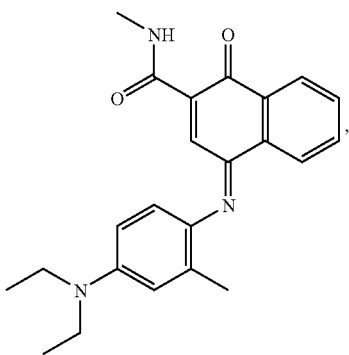

,

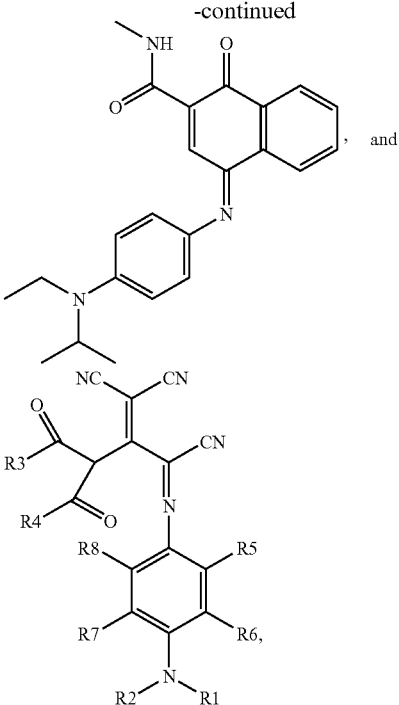

and where R1 and R2 each independently represents an alkyl group, a cycloalkyl group, an aryl group, a heterocyclic group, or R1 and R2 together represent the necessary atoms to close a heterocyclic ring, or R1 and/or R2 together with R6 and/or R7 represent the necessary atoms to close a heterocyclic ring fused on the benzene ring; R3 and R4 each independently represents an alkyl group, or an alkoxy group; R5, R6, R7 and R8 each independently represents hydrogen, an alkyl group, a cycloalkyl group, an aryl group, an alkoxy group, an aryloxy group, a carbonamido group, a sulfamido group, hydroxy, halogen, $NHSO_2R_9$, $NHCOR_9$, $OSO_2R_9$, or $OCOR_9$, or R5 and R6 together and/or R7 and R8 together represent the necessary atoms to close one or more heterocyclic ring fused on the benzene ring, or R6 and/or R7 together with R1 and/or R2 represent the necessary atoms to close a heterocyclic ring fused on the benzene ring; and R9 represents an alkyl group, a cycloalkyl group, an aryl group and a heterocyclic group.

Another preferred embodiment utilizes a yellow dye, alone or in combination, comprising at least a first yellow dye of the following structure X:

(X)

wherein $R^1$ and $R^2$ can be respectively independently selected and are a lower alkyl group which may be substituted, a lower alkenyl group which may be substituted or an aryl group which may be substituted; and $R^3$ and $R^4$ can be respectively independently selected and are a lower alkyl group which may be substituted, a dialkylamino group, a —$COOR^5$ group or a —$CONR^6R^7$ group, in which $R^5$ is a lower alkyl group which may be substituted, a lower alkenyl group which may be substituted or an aryl group which may be substituted and $R^6$ and $R^7$ can be respectively independently selected and are a hydrogen atom, a lower alkyl group which may be substituted, a lower alkenyl group which may be substituted or an aryl group which may be substituted.

A preferred yellow dye of structure X specifically has the following structure:

(Xa)

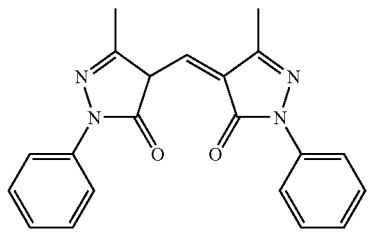

Another preferred embodiment utilizes a yellow dye, alone or in combination, comprising at least a first yellow dye of the following structure XI:

(XI)

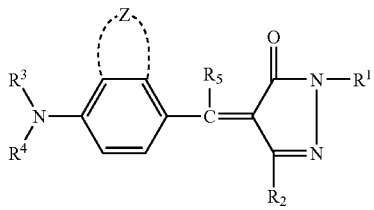

wherein $R^1$ represents a substituted or unsubstituted alkyl group having from 1 to about 10 carbon atoms; a cycloalkyl group having from about 5 to about 7 carbon atoms or an aryl group having from about 6 to about 10 carbon atoms; $R^2$ represents a substituted or unsubstituted alkoxy group having from 1 to about 10 carbon atoms; a substituted or unsubstituted aryloxy group having from about 6 to about 10 carbon atoms; $NHR^6$; $NR^6$, $R^7$ or the atoms necessary to complete a 6-membered ring fused to the benzene ring; $R^3$ and $R^4$ each represents $R^1$; or $R^3$ and $R^4$ can be joined together to form, along with the nitrogen to which they are attached, a 5- or 6-membered heterocyclic ring; $R^5$ represents hydrogen; halogen; carbamoyl; alkoxycarbonyl; acyl; a substituted or unsubstituted alkyl or alkoxy group having from 1 to about 10 carbon atoms; a cycloalkyl group having from about 5 to about 7 carbon atoms; an aryl group having from about 6 to about 10 carbon atoms; or a dialkylamino group; $R^6$ and $R^7$ each independently represents a substituted or unsubstituted alkyl group having from 1 to about 10 carbon atoms; a cycloalkyl group having from about 5 to about 7 carbon atoms or an aryl group having from about 6 to about 10 carbon atoms; $R^6$ and $R^7$ may be joined together to form, along with the nitrogen to which they are attached, a 5- or 6-membered heterocyclic ring; and Z represents hydrogen or the atoms necessary to complete a 5- or 6-membered ring.

A preferred yellow dye of structure XI specifically has the following structure:

(XIa)

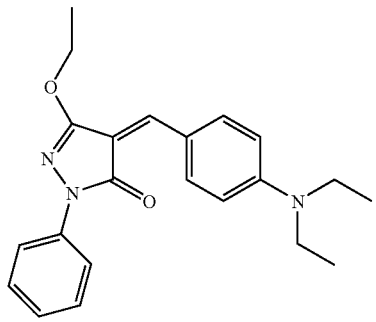

Another preferred embodiment utilizes a yellow dye, alone or in combination, comprising at least a first yellow dye of the following structure XII:

(XII)

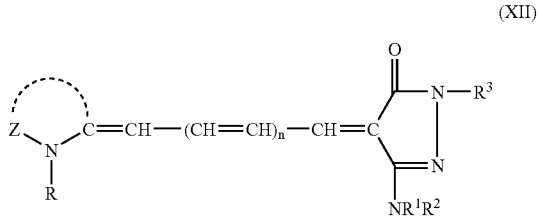

wherein: R represents a substituted or unsubstituted alkyl group of from 1 to about 6 carbon atoms or a substituted or unsubstituted aryl group of from about 6 to about 10 carbon atoms; $R^1$ and $R^2$ each independently represents hydrogen, with the proviso that only one of $R^1$ and $R^2$ may be hydrogen at the same time; a substituted or unsubstituted alkyl group of from 1 to about 6 carbon atoms or a substituted or unsubstituted aryl group of from about 6 to about 10 carbon atoms; or $R^1$ and $R^2$ may be combined together with the nitrogen to which they are attached to form a heterocyclic ring system; $R^3$ is R; n represents 0 or 1; and Z represents the atoms necessary to complete a 5- or 6-membered substituted or unsubstituted heterocyclic ring.

A preferred yellow dye of structure XII specifically has the following structure:

(XIIa)

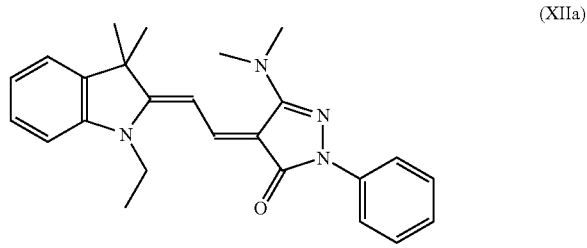

Another preferred embodiment utilizes a yellow dye, alone or in combination, comprising at least a first yellow dye of the following structure XIII:

(XIII)

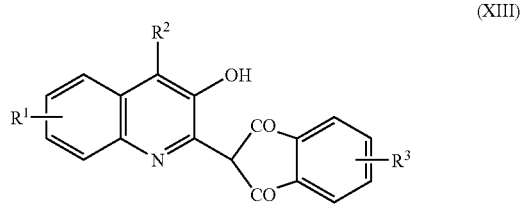

wherein $R_1$ is an alkyl group having 1 to 8 carbon atoms or cycloalkyl group; $R_2$ is a hydrogen atom, halogen atom, alkoxy group which may be substituted, alkylthio group which may be substituted or arylthio group which may be substituted; $R_3$ is a branched alkyl group having 3 to 5 carbon atoms, an O-substituted oxycarbonyl group, an N-substituted aminocarbonyl group in which the N-substituted group may form a ring, or a substituted or unsubstituted heterocyclic ring having two or more hetero atoms of one or more kinds selected from the group consisting of a nitrogen atom, oxygen atom and sulfur atom.

A preferred yellow dye of structure XIII specifically has the following structure:

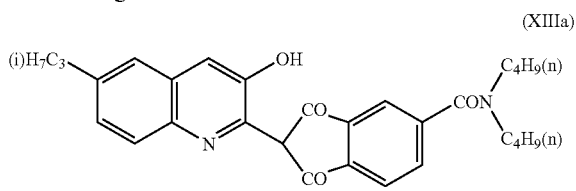

(XIIIa)

Other suitable yellow dyes can include Phorone Brilliant Yellow S-6 GL (Disperse Yellow 231, manufactured by Sandoz K. K.) and Macrolex Yellow 6G (Disperse Yellow 201, manufactured by Bayer), and yellow dyes of the structures:

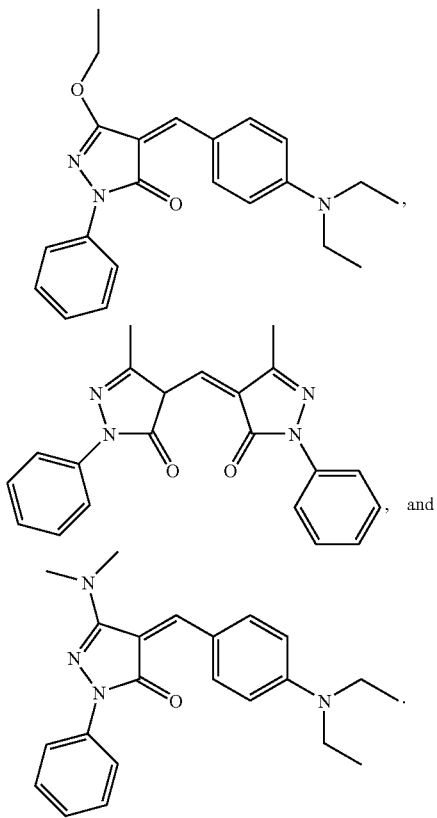

Further examples of useful dyes can be found in U.S. Pat. Nos. 4,541,830; 4,698,651; 4,695,287; 4,701,439; 4,757,046; 4,743,582; 4,769,360; 4,753,922; 4,910,187; 5,026,677; 5,101,035; 5,142,089; 5,374,601; 5,476,943; 5,532,202; 5,804,531; 6,265,345, and U.S. Patent Application Publication No. US 2003/0181331, the disclosures of which are hereby incorporated by reference.

The dyes can be employed singly or in combination to obtain a monochrome dye-donor layer or a black dye-donor layer. The dyes can be used in an amount of from 0.05 g/m² to 1 g/m² of coverage. According to various embodiments, the dyes can be hydrophobic.

As noted above, dye-donor elements may be used to form a dye transfer image. Such a process comprises imagewise-heating a dye-donor element and transferring a dye image to a dye-receiving element as described above to form the dye transfer image.

A dye-donor element may be employed which comprises a poly(ethylene terephthalate) support coated with sequential repeating areas of cyan, magenta and yellow dye, and the dye transfer steps are sequentially performed for each color to obtain a three-color dye transfer image. Of course, when the process is only performed for a single color, then a monochrome dye transfer image may be obtained. The dye-donor element may also contain a colorless area which may be transferred to the receiving element to provide a protective overcoat. This protective overcoat may be transferred to the receiving element by heating uniformly at an energy level equivalent to 85% of that used to print maximum image dye density.

Thermal printing heads which may be used to transfer ink or dye from ink or dye-donor elements to receiving or recording elements used with the invention may be available commercially. There may be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal ink or dye transfer may be used, such as lasers as described in, for example, GB No. 2,083,726A, incorporated herein by reference.

A thermal ink or dye transfer assemblage may comprise (a) an ink or dye-donor element, and (b) an ink or dye-receiving or recording element as described above, the ink or dye-receiving or recording element being in a superposed relationship with the ink or dye-donor element so that the ink or dye layer of the donor element may be in contact with the ink or dye image-receiving or recording layer of the receiving or recording element.

When a three-color image is to be obtained, the above assemblage may be formed on three occasions during the time when heat may be applied by the thermal printing head. After the first dye is transferred, the elements may be peeled apart. A second dye-donor element (or another area of the donor element with a different dye area) may be then brought in register with the dye-receiving recording element and the process repeated. The third color may be obtained in the same manner.

The dye-transfer dye-image receiving layer typically would comprise a polymeric binder. Typical polymeric binders may be polyester or polycarbonate. In a preferred embodiment, the polymeric binder comprises both polyester and polycarbonate polymer. Typical weighted ratios of the polyester to the polycarbonate of the binder may be in the range of 0.8-4.0 to 1.

It may be sometimes desirable for the thermal dye-transfer dye-image receiving layer to also comprise other additives. Lubricants may be added to enable improved conveyance through a printer. An example of a lubricant is a polydimethylsiloxane-containing copolymer. A preferred lubricant may be a polycarbonate random terpolymer of bisphenol A, diethylene glycol, and polydimethylsiloxane block unit and may be present in an amount of from 10% to 30% by weight of the image recording layer. Other additives that may be included in the thermal dye-transfer dye-image receiving layer may be plasticizers. Typical plasticizers that may be used comprise ester or polyester. A preferred plasticizer may be a mixture of 1,3-butylene glycol adipate and dioctyl sebacate. This plasticizer would typically be present in the dye-transfer dye-image receiving layer in a combined total amount of from 4% to 20% by weight of the dye-receiving layer.

The image receiving element may also comprise a swellable inkjet receiving or recording element. The inkjet recording element utilizing the present invention would desirably be capable of absorbing or receiving large amounts of ink applied to the image-forming surface of the element as possible in order to produce recorded images having high optical density and good color gamut. One preferred embodiment of this invention is an image recording element with an inkjet recording layer.

Inks used to image the recording elements are well known in the art. The ink compositions used in inkjet printing typically may be liquid compositions comprising a solvent or carrier liquid, dyes, humectants, organic solvents, detergents, thickeners, preservatives. The solvent or carrier liquid may be solely water or may be water mixed with other water-miscible solvents such as polyhydric alcohols. Inks in which organic materials such as polyhydric alcohols may be the predominant carrier or solvent liquid may also be used. Particularly useful are mixed solvents of water and polyhydric alcohols. The dyes used in such compositions may be typically water-soluble direct or acid type dyes. Such liquid compositions have been described extensively in the prior art including, for example, U.S. Pat. Nos. 4,381,946; 4,239,543; and 4,781,758, the disclosures of which are hereby incorporated by reference.

Any known inkjet receiver layer may be used in combination with other particulate materials. For example, the ink receiving or recording layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, derivatives of natural polymers such as functionalized proteins, functionalized gums and starches, and cellulose ethers and their derivatives, and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers, and combinations of these materials. Hydrophilic polymers, inorganic oxide particles, and organic beads may be present in one or more layers on the substrate or support and in various combinations within a layer.

If desired, the ink receiving or recording layer may be overcoated with an ink-permeable, anti-tack protective layer such as, for example, a layer comprising a cellulose derivative or a cationically-modified cellulose derivative or mixtures thereof. An especially preferred overcoat is poly $\beta$-1,4-anhydro-glucose-g-oxyethylene-g-(2'-hydroxypropyl)-N,N-dimethyl-N-dodecylammonium chloride. The overcoat layer is preferred to be non porous, but may be ink permeable and serves to improve the optical density of the images printed on the element with water-based inks. The overcoat layer may also protect the ink receiving or recording layer from abrasion, smudging, and water damage. In general, this overcoat layer may be present at a dry thickness of from 0.1 to 5 μm, preferably from 0.25 to 3 μm.

In practice, various additives may be employed in the ink receiving or recording layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, light stabilizers. In addition, a mordant may be added in small quantities (2%-110% by weight of the base layer) to improve waterfastness. Useful mordants are disclosed in U.S. Pat. No. 5,474,843, incorporated herein by reference.

There are many known formulations, which may be useful as ink or dye receiving or recording layers. The primary requirement is that the image receiving layer (IRL) is compatible with the inks which it will be imaged so as to yield the desirable color gamut and density. As the ink drops pass through the image receiving layer (IRL), the ink or dyes may be retained or mordanted in the image receiving layer (IRL), while the ink solvents pass freely through the image receiving layer (IRL) and may be rapidly absorbed by the tie layer (TL). Additionally, the image receiving layer (IRL) formulation may be preferably coated from water, exhibits adequate adhesion to the tie layer (TL), and allows for easy control of the surface gloss. For example, U.S. Pat. Nos. 4,879,166; 5,264,275; 5,104,730; 4,879,166; and Japanese Patents 1,095,091; 2,276,671; 2,276,670; 4,267,180; 5,024,335; and 5,016,517, all incorporated herein by reference, disclose aqueous based image receiving layer (IRL) formulations comprising mixtures of pseudo-bohemite and certain water soluble resins. U.S. Pat. Nos. 4,903,040; 4,930,041; 5,084,338; 5,126,194; 5,126,195; and 5,147,717, all incorporated herein by reference, disclose aqueous-based image receiving layer (IRL) formulations comprising mixtures of vinyl pyrrolidone polymers and certain water-dispersible and/or water-soluble polyesters, along with other polymers and addenda. U.S. Pat. Nos. 4,857,386 and 5,102,717, both incorporated herein by reference, disclose ink-absorbent resin layers comprising mixtures of vinyl pyrrolidone polymers and acrylic or methacrylic polymers. U.S. Pat. No. 5,194,317, incorporated herein by reference, and U.S. Pat. No. 5,059,983, incorporated herein by reference, disclose aqueous-coatable image receiving layer (IRL) formulations based on poly(vinyl alcohol). U.S. Pat. No. 5,208,092, incorporated herein by reference, discloses water-based image receiving layer (IRL) formulations comprising vinyl copolymers, which may be subsequently crosslinked.

The image receiving layer (IRL) may also contain varying levels and sizes of matting agents for the purpose of controlling gloss, friction, and/or fingerprint resistance, surfactants to enhance surface uniformity and to adjust the surface tension of the dried coating, mordanting agents, antioxidants, LW absorbing compounds, light stabilizers.

It may also be desirable to overcoat the image receiving layer (IRL) for the purpose of enhancing the durability of the imaged element. Such overcoats may be applied to the image receiving layer (IRL) either before or after the element is imaged. For example, the image receiving layer (IRL) may be overcoated with an ink-permeable layer through which inks freely pass. Layers of this type are described in U.S. Pat. Nos. 4,686,118; 5,027,131; and 5,102,717, all incorporated herein by reference. Alternatively, an overcoat may be added after the element is imaged. Any of the known laminating films and equipment may be used for this purpose. The inks used in the aforementioned imaging process are well known, and the ink formulations are often closely tied to the specific processes, that is, continuous, piezoelectric, or thermal. Therefore, depending on the specific ink process, the inks may contain widely differing amounts and combinations of solvents, colorants, preservatives, surfactants, humectants. Inks preferred for use in combination with the image recording elements may be water-based.

One or more subbing layers may be present on top of the support or between the base and the image recording layer. These layers may add functionality such as antistatic properties, control colorimetry, and improve image recording layer adhesion to the base. This layer may be an adhesive layer such as, for example, halogenated phenols, partially hydrolyzed vinyl chloride-co-vinyl acetate polymer, vinylidene chloride-methyl acrylate-itaconic acid terpolymer, a vinylidene chloride-acrylonitrile-acrylic acid terpolymer, or a glycidyl (meth)acrylate polymer or copolymer. Other chemical adhesives, such as polymers, copolymers, reactive polymers or copolymers, that exhibit good bonding between the ink receiving layer and the support may be used. Polymeric binder utilized in the subbing layer may be preferably a water soluble or water dispersible polymer such as poly(vinyl alcohol), poly(vinyl pyrrolidone), gelatin, a cellulose ether, a poly(oxazoline), a poly(vinylacetamide), partially hydrolyzed poly(vinyl acetate/vinyl alcohol), poly(acrylic acid), poly(acrylamide), poly(alkylene oxide), a sulfonated or phosphated polyester or polystyrene, casein, zein, albumin, chitin, chitosan, dextran, pectin, a collagen derivative, collodian, agar-agar, arrowroot, guar, carrageenan, tragacanth, xanthan, rhamsan, a latex such as poly(styrene-co-butadiene), a polyurethane latex, a polyester latex, or a poly(acrylate), poly(methacrylate), poly(acrylamide) or copolymers thereof.

The image recording layers may be coated by conventional coating means commonly used in this art. Coating methods may include, but are not limited to, wound wire rod coating, knife coating, slot coating, slide hopper coating, gravure coating, spin coating, dip coating, skim-pan-air-knife coating, multilayer slide bead, doctor blade coating, gravure coating, reverse-roll coating, curtain coating, multilayer curtain coating. Some of these methods allow for simultaneous coatings of more than one layer, which is preferred from a manufacturing economic perspective if more than one layer or type of layer needs to be applied. Known coating and drying methods are described in further detail in *Research Disclosure* No. 308119, published December 1989, pages 1007-1008, incorporated herein by reference. After coating, the layers are generally dried by simple evaporation, which may be accelerated by known techniques such as convection heating.

The coating composition may be applied to one or both substrate or support surfaces through conventional pre-metered or post-metered coating methods listed above. The choice of coating process would be determined from the economics of the operation and, in turn, would determine the formulation specifications such as coating solids, coating viscosity, and coating speed.

As used herein, the phrase "photographic element" is a material that utilizes photosensitive silver halide in the formation of images. The photographic elements may be black and white, single color elements or multicolor elements. Multicolor elements contain image dye-forming units sensitive to each of the three primary regions of the spectrum. Each unit may comprise a single emulsion layer or multiple emulsion layers sensitive to a given region of the spectrum. The layers of the element, including the layers of the image-forming units, may be arranged in various orders as known in the art. In an alternative format, the emulsions sensitive to each of the three primary regions of the spectrum may be disposed as a single segmented layer.

In one embodiment, the invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to 10 milliseconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above. In a preferred practical application, the advantages can be transformed into increased throughput of digital substantially artifact-free color print images while exposing each pixel sequentially in synchronism with the digital data from an image processor. While certain embodiments of the invention are specifically directed towards electronic printing and conventional optical printing, use of the emulsions and elements of the invention is not limited to such specific embodiments.

For a display material used with this invention, at least one image layer containing silver halide and a dye-forming coupler located on the top side or surface and bottom side or surface of the imaging element is suitable. Applying the imaging layer to either the top or the bottom is suitable for a photographic display material, but it is not sufficient to create a photographic display material that is optimum for both a reflection display and a transmission display. For the display material used with this invention, at least one image layer comprises at least one dye-forming coupler located on both the top and bottom of the imaging support is preferred. Applying an imaging layer to both the top and bottom of the support allows for the display material to have the required density for both reflective viewing and for transmission viewing of the image. This duplitized "day/night" photographic display material has significant commercial value in that the day/night display material may be used for both reflective viewing and transmission viewing. Prior art display materials were optimized for either transmission viewing or reflective viewing but not both simultaneously.

It has been found that the duplitized emulsion coverage should be in a range that is greater than 75% and less than 175% of typical emulsion coverages for reflective consumer paper that contain typical amounts of silver and coupler. At coverages of less than 75% on the front side it was found that a pleasing reflection print may not be obtained. Further, at coverages of less than 75% on the backside, pleasing transmission images may not be obtained. Coverages greater than 175% are undesirable because of the increased material expense and also because of the need for extended development times in the processing solutions. In a more preferred embodiment, emulsion laydowns should be from 100 to 150% of that found for a typical reflective consumer color paper.

The display material wherein the amount of dye-forming coupler is substantially the same on the top and bottom sides is most preferred because it allows for optimization of image density, while allowing for developer time less than 50 seconds. Further, coating substantially the same amount of light sensitive silver halide emulsion on both sides has the additional benefit of balancing the imaging element for image curl caused by the contraction and expansion of the hygroscopic gel typically found in photographic emulsions.

Useful photographic emulsions are generally prepared by precipitating silver halide crystals in a colloidal matrix by methods conventional in the art. The colloid is typically a hydrophilic sheet-forming agent such as gelatin, algnic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 55-70° C., and maintained for a period of time. The precipitation and spectral and chemical sensitization methods utilized in preparing the emulsions may be those methods known in the art.

Chemical sensitization of the emulsion typically employs sensitizers such as: sulfur-containing compounds, for example, allyl isothiocyanate, sodium thiosulfate and allyl thiourea; reducing agents, for example, polyamines and stannous salts; noble metal compounds, for example, gold, platinum; and polymeric agents, for example, polyalkylene oxides. As described, heat treatment is employed to complete chemical sensitization. Spectral sensitization is effected with a combination of dyes, which are designed for the wavelength range of interest within the visible or infrared spectrum. It is known to add such dyes before, during, or after heat treatment.

The silver halide emulsions may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than 50 mole percent silver chloride. Preferably, they are greater than 90 mole percent silver chloride; and, optimally, greater than 95 mole percent silver chloride.

The silver halide emulsions may contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements may utilize emulsions as described in *The Theory of the Photographic Process*, Fourth Edition, T. H. James, Macmillan Publishing Company, Inc., 1977, pages 151-152, incorporated herein by reference. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization may be performed intentionally by adding reduction sensitizers, chemicals that reduce silver ions to form metallic silver atoms, or by providing a reducing environment such as high pH (excess hydroxide ion) and/or low pAg (excess silver ion). During precipitation of a silver halide emulsion, unintentional reduction sensitization may occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823, incorporated herein by reference. Specific examples of reduction sensitizers or conditions, such as dimethylamineborane, stannous chloride, hydrazine, high pH (pH 8-11) and low pAg (pAg 1-7) ripening are discussed by S. Collier in Photographic Science and Engineering, 23, p. 113 (1979), incorporated herein by reference. Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino), incorporated herein by reference.

The photographic elements may use emulsions doped with Group VIII metals such as iridium, rhodium, osmium, and iron as described in Research Disclosure, September 1994, Item 36544, Section I, published by Kenneth Mason Publications, Ltd., Dudley Annex, 12a North Street, Emsworth, Hampshire PO10 7DQ, ENGLAND, incorporated herein by reference. Additionally, a general summary of the use of iridium in the sensitization of silver halide emulsions is contained in Carroll, "Iridium Sensitization: A Literature Review," Photographic Science and Engineering, Vol. 24, No. 6, 1980, incorporated herein by reference. A method of manufacturing a silver halide emulsion by chemically sensitizing the emulsion in the presence of an iridium salt and a photographic spectral sensitizing dye is described in U.S. Pat. No. 4,693,965, incorporated herein by reference. In some cases, when such dopants are incorporated, emulsions show an increased fresh fog and a lower contrast sensitometric curve when processed in the color reversal E-6 process as described in The British Journal of Photography Annual, 1982, pages 201-203, incorporated herein by reference.

A typical multicolor photographic element comprises a laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers. The support may also be utilized for black and white photographic print elements.

A radiation-sensitive emulsion comprised of silver halide grains (a) containing greater than 50 mole percent chloride, based on silver, (b) having greater than 50 percent of their surface area provided by (100) crystal faces, and (c) having a central portion accounting for from 95 to 99 percent of total silver and containing two dopants selected to satisfy each of the following class requirements: (i) a hexacoordination metal complex which satisfies the formula $$[ML_6]^n \tag{I}$$

wherein n is zero, −1, −2, −3, or −4; M is a filled frontier orbital polyvalent metal ion, other than iridium; and $L_6$ represents bridging ligands which may be independently selected, provided that least four of the ligands are anionic ligands, and at least one of the ligands is a cyano ligand or a ligand more electronegative than a cyano ligand; and (ii) an iridium coordination complex containing a thiazole or substituted thiazole ligand may be used with the present invention.

The combination of dopants (i) and (ii) provides greater reduction in reciprocity law failure than may be achieved with either dopant alone. The combination of dopants (i) and (ii) achieves reductions in reciprocity law failure beyond the simple additive sum achieved when employing either dopant class by itself. The combination of dopants (i) and (ii) provides greater reduction in reciprocity law failure, particularly for high intensity and short duration exposures. The combination of dopants (i) and (ii) further achieves high intensity reciprocity with iridium at relatively low levels, and both high and low intensity reciprocity improvements even while using conventional gelatino-peptizer (for example, other than low methionine gelatino-peptizer).

Improved reciprocity performance may be obtained for silver halide grains (a) containing greater than 50 mole percent chloride, based on silver, and (b) having greater than 50 percent of their surface area provided by {100} crystal faces by employing a hexacoordination complex dopant of class (i) in combination with an iridium complex dopant comprising a thiazole or substituted thiazole ligand. The reciprocity improvement is obtained for silver halide grains employing conventional gelatino-peptizer, unlike the contrast improvement described for the combination of dopants set forth in U.S. Pat. Nos. 5,783,373 and 5,783,378, incorporated herein by reference, which requires the use of low methionine gelatino-peptizers as discussed therein, and which states it is preferable to limit the concentration of any gelatino-peptizer with a methionine level of greater than 30 micromoles per gram to a concentration of less than 1 percent of the total peptizer employed. It is specifically contemplated to use significant levels (that is, greater than 1 weight percent of total peptizer) of conventional gelatin (for example, gelatin having at least 30 micromoles of methionine per gram) as a gelatino-peptizer for the silver halide grains of the emulsions. A gelatino-peptizer is employed which comprises at least 50 weight percent of gelatin containing at least 30 micromoles of methionine per gram, as it is frequently desirable to limit the level of oxidized low methionine gelatin which may be used for cost and certain performance reasons.

It may be contemplated to employ a class (i) hexacoordination complex dopant satisfying the formula:

$$[ML_6]^n \qquad (I)$$

wherein n is zero, −1, −2, −3, or −4; M is a filled frontier orbital polyvalent metal ion, other than iridium, preferably $Fe^{+2}$, $Ru^{+2}$, $Os^{+2}$, $Co^{+3}$, $Rh^{+3}$, $Pd^{+4}$ or $Pt^{+4}$, more preferably an iron, ruthenium or osmium ion, and most preferably a ruthenium ion; $L_6$ represents six bridging ligands, which may be independently selected, provided that least four of the ligands are anionic ligands and at least one (preferably at least 3 and optimally at least 4) of the ligands is a cyano ligand or a ligand more electronegative than a cyano ligand. Any remaining ligands may be selected from among various other bridging ligands, including aquo ligands, halide ligands (specifically, fluoride, chloride, bromide and iodide), cyanate ligands, thiocyanate ligands, selenocyanate ligands, tellurocyanate ligands, and azide ligands. Hexacoordinated transition metal complexes of class (i) which include six cyano ligands are specifically preferred.

Illustrations of specifically contemplated class (i) hexacoordination complexes for inclusion in the high chloride grains are provided by Olm et al U.S. Pat. No. 5,503,970 and Daubendiek et al U.S. Pat. Nos. 5,494,789 and 5,503,971, and Keevert et al U.S. Pat. No. 4,945,035, as well as Murakami et al Japanese Patent Application Hei-2[1990]-249588, and Research Disclosure Item 36736, all incorporated herein by reference. Useful neutral and anionic organic ligands for class (ii) dopant hexacoordination complexes are disclosed by Olm et al U.S. Patent 5,360,712 and Kuromoto et al U.S. Pat. No. 5,462,849, incorporated herein by reference.

Class (i) dopant is preferably introduced into the high chloride grains after at least 50 (most preferably 75 and optimally 80) percent of the silver has been precipitated, but before precipitation of the central portion of the grains has been completed. Preferably class (i) dopant is introduced before 98 (most preferably 95 and optimally 90) percent of the silver has been precipitated. Stated in terms of the fully precipitated grain structure, class (i) dopant is preferably present in an interior shell region that surrounds at least 50 (most preferably 75 and optimally 80) percent of the silver and, with the more centrally located silver, accounts the entire central portion (99 percent of the silver), most preferably accounts for 95 percent, and optimally accounts for 90 percent of the silver halide forming the high chloride grains. The class (i) dopant may be distributed throughout the interior shell region delimited above or may be added as one or more bands within the interior shell region.

Class (i) dopant may be employed in any conventional useful concentration. A preferred concentration range is from $10^{-8}$ to $10^{-3}$ mole per silver mole, most preferably from $10^{-6}$ to $5 \times 10^{-4}$ mole per silver mole.

The following are specific illustrations of class (i) dopants: (i-1)[Fe(CN)$_6$]$^{-4}$; (i-2)[Ru(CN)$_6$]$^{-4}$; (i-3)[Os(CN)$_6$]$^{-4}$; (i-4) [Rh(CN)$_6$]$^{-3}$; (i-5) [Co(CN)$_6$]$^{-3}$; (i-6) [Fe(pyrazine)(CN)$_5$]$^{-4}$; (i-7) [RuCl(CN)$_5$]$^{-4}$; (i-8) [OsBr(CN)$_5$]$^{-4}$; (i-9) [RhF(CN)$_5$]$^{-3}$; (i-10) [In(NCS)$_6$]$^{-3}$; (i-11) [FeCO(CN)$_5$]$^{-3}$; (i-12) [RuF$_2$(CN)$_4$]$^{-4}$; (i-13) [OsCl$_2$(CN)$_4$]$^{4}$; (i-14) [RhI$_2$(CN)$_4$]$^{-3}$; (i-15) [Ga(NCS)$_6$]$^{-3}$; (i-16) [Ru(CN)$_5$(OCN)]$^{-4}$; (i-17) [Ru(CN)$_5$(N$_3$)]$^{-4}$; (i-18) [Os(CN)$_5$(SCN)]$^{-4}$; (i-19) [Rh(CN)$_5$(SeCN)]$^{-3}$; (i-20) [Os(CN)Cl$_5$]$^{-4}$; (i-21) [Fe(CN)$_3$Cl$_3$]$^{-3}$; (i-22) [Ru(CO)$_2$(CN)$_4$]$^{-1}$ When the class (i) dopants have a net negative charge, it is appreciated that they are associated with a counter ion when added to the reaction vessel during precipitation. The counter ion is of little importance, since it is ionically dissociated from the dopant in solution and is not incorporated within the grain. Common counter ions known to be fully compatible with silver chloride precipitation, such as ammonium and alkali metal ions, are contemplated. It is noted that the same comments apply to class (ii) dopants, otherwise described below.

The class (ii) dopant is an iridium coordination complex containing at least one thiazole or substituted thiazole ligand. Careful scientific investigations have revealed Group VIII hexahalo coordination complexes to create deep electron traps, as illustrated R. S. Eachus, R. E. Graves and M. T. Olm *J. Chem. Phys.*, Vol. 69, pp. 4580-7 (1978) and *Physica Status Solidi A*, Vol. 57, 429-37 (1980) and R. S. Eachus and M. T. Olm *Annu. Rep. Prog. Chem. Sect. C. Phys. Chem.*, Vol. 83, 3, pp. 3-48 (1986), all incorporated herein by reference. The class (ii) dopants are believed to create such deep electron traps. The thiazole ligands may be substituted with any photographically acceptable substituent which does not prevent incorporation of the dopant into the silver halide grain. Exemplary substituents include lower alkyl (for example, alkyl groups containing 1-4 carbon atoms), and specifically methyl. A specific example of a substituted thiazole ligand which may be used is 5-methylthiazole. The class (ii) dopant preferably is an iridium coordination complex having ligands each of which are more electropositive than a cyano ligand. In a specifically preferred form the remaining non-thiazole or non-substituted-thiazole ligands of the coordination complexes forming class (ii) dopants are halide ligands.

It is specifically contemplated to select class (ii) dopants from among the coordination complexes containing organic ligands disclosed by U.S. Pat. No. 5,360,712; U.S. Pat. No. 5,457,021; and U.S. Pat. No. 5,462,849, incorporated herein by reference.

In a preferred form it is contemplated to employ as a class (ii) dopant a hexacoordination complex satisfying the formula:

$$[IrL_6]^{n'} \qquad (II)$$

wherein n' is zero, −1, −2, −3, or −4; and $L^1_6$ represents six bridging ligands which may be independently selected, provided that at least four of the ligands are anionic ligands, each of the ligands is more electropositive than a cyano ligand, and at least one of the ligands comprises a thiazole or substituted thiazole ligand. In a specifically preferred form at least four of the ligands are halide ligands, such as chloride or bromide ligands.

Class (ii) dopant is preferably introduced into the high chloride grains after at least 50 (most preferably 85 and optimally 90) percent of the silver has been precipitated, but before precipitation of the central portion of the grains has been completed. Preferably class (ii) dopant is introduced before 99 (most preferably 97 and optimally 95) percent of the silver has been precipitated. Stated in terms of the fully precipitated grain structure, class (ii) dopant is preferably present in an interior shell region that surrounds at least 50 (most preferably 85 and optimally 90) percent of the silver and, with the more centrally located silver, accounts the entire central portion (99 percent of the silver), most preferably accounts for 97 percent, and optimally accounts for 95 percent of the silver halide forming the high chloride grains. The class (ii) dopant may be distributed throughout the interior shell region delimited above or may be added as one or more bands within the interior shell region.

Class (ii) dopant may be employed in any conventional useful concentration. A preferred concentration range is from $10^{-9}$ to $10^{-4}$ mole per silver mole. Iridium is most preferably employed in a concentration range of from $10^{-8}$ to $10^{-5}$ mole per silver mole.

Specific illustrations of class (ii) dopants are the following: ii-1) $[IrCl_5(thiazole)]^{-2}$; (ii-2) $[IrCl_4(thiazole)_2]^{-1}$; (ii-3) $[IrBr_5(thiazole)]^{-2}$; (ii-4) $[IrBr_4(thiazole)_2]^{-1}$; (ii-5) $[IrCl_5(5\text{-methylthiazole})]\text{-}2$; (ii-6) $[IrCl_4(5\text{-methylthiazole})_2]^{-1}$; (ii-7) $[IrBr_5(5\text{-methylthiazole})]^{-2}$; (ii-8) $[IrBr_4(5\text{-methylthiazole})_2]^{-1}$ It may be contemplated to employ a class (iii) hexacoordination complex dopant generically defined by the formula:

$$[TE_4(NZ)E']r \qquad (III)$$

Wherein T is a transition metal selected from Groups 5 to 10, inclusive, of the periodic table; Z is oxygen or sulfur, and together with nitrogen forms the nitrosyl thionitrosyl ligand; E and B' represent ligands additional to the nitrosyl or thionitrosyl ligand; and r is 0, −1, −2, or −3. Preferably the transition metal is selected from Group 8 of the periodic table. Optimally it is selected from either osmium or ruthenium. Specific examples of preferred ligands represented by E include aquo ligands, halide ligands, cyanide ligands, cyanate ligands, thiocyanate ligands, selenocyanate ligands, tellurocyanate ligands, azide ligands, and organic ligands as described in U.S. Pat. No. 5,360,712, incorporated herein by reference. The ligand defined above by E' represents either B, nitrosyl or thionitrosyl.

Preferred class (iii) transition metal dopants for modifying the speed and contrast of emulsions include $Os(NO)Cl_5^{-2}$ and $Ru(NO)Br_5^{-2}$.

Emulsions may be realized by modifying the precipitation of conventional high chloride silver halide grains having predominantly (>50%) {100} crystal faces by employing a combination of class (i), class (ii) and class (iii) dopants as described above.

The silver halide grains precipitated contain greater than 50 mole percent chloride, based on silver. Preferably the grains contain at least 70 mole percent chloride, and, optimally, at least 90 mole percent chloride, based on silver. Iodide may be present in the grains up to its solubility limit, which is in silver iodochloride grains, under typical conditions of precipitation, 11 mole percent, based on silver. It is preferred for most photographic applications to limit iodide to less than 5 mole percent iodide, most preferably less than 2 mole percent iodide, based on silver.

Silver bromide and silver chloride are miscible in all proportions. Hence, any portion, up to 50 mole percent, of the total halide not accounted for chloride and iodide, may be bromide. For color reflection print (that is, color paper) uses bromide is typically limited to less than 10 mole percent based on silver, and iodide is limited to less than 1 mole percent based on silver.

In a widely used form high chloride grains are precipitated to form cubic grains—that is, grains having {100} major faces and edges of equal length. In practice ripening effects usually round the edges and corners of the grains to some extent. However, except under extreme ripening conditions substantially more than 50 percent of total grain surface area is accounted for by {100} crystal faces.

High chloride tetradecahedral grains are a common variant of cubic grains. These grains contain 6 {100} crystal faces and 8 {111} crystal faces. Tetradecahedral grains are within contemplation, to the extent that greater than 50 percent of total surface area is accounted for by {100} crystal faces.

Although it is common practice to avoid or minimize the incorporation of iodide into high chloride grains employed in color paper, it is has been recently observed that silver iodochloride grains with {100} crystal faces and, in some instances, one or more {111} faces offer exceptional levels of photographic speed. In the these emulsions iodide is incorporated in overall concentrations of from 0.05 to 3.0 mole percent, based on silver, with the grains having a surface shell of greater than 50 Å that is substantially free of iodide and a interior shell having a maximum iodide concentration that surrounds a core accounting for at least 50 percent of total silver. Such grain structures are illustrated by Chen et al EPO 0718679, incorporated herein by reference.

In another improved form the high chloride grains may take the form of tabular grains having {100} major faces. Preferred high chloride {100} tabular grain emulsions are those in which the tabular grains account for at least 70 (most preferably at least 90) percent of total grain projected area. Preferred high chloride {100} tabular grain emulsions have average aspect ratios of at least 5 (most preferably at least >8). Tabular grains typically have thicknesses of less than 0.3 µm, preferably less than 0.2 µm, and optimally less than 0.07 µm. High chloride {100} tabular grain emulsions and their preparation are disclosed by U.S. Pat. Nos. 5,264,337 and 5,292,632; U.S. Pat. No. 5,320,938; U.S. Pat. No. 5,314,798; and U.S. Pat. No. 5,413,904, incorporated herein by reference.

Once high chloride grains having predominantly {100} crystal faces have been precipitated with a combination of class (i) and class (ii) dopants described above, chemical and spectral sensitization, followed by the addition of conventional addenda to adapt the emulsion for the imaging application of choice may take any convenient conventional form. These conventional features are illustrated by *Research Disclosure*, Item 38957, cited above, particularly: III. Emulsion washing; IV. Chemical sensitization; V. Spectral sensitization and desensitization; VII. Antifoggants and stabilizers; VIII. Absorbing and scattering materials; IX. Coating and physical property modifying addenda; and X. Dye image formers and modifiers.

Some additional silver halide, typically less than 1 percent, based on total silver, may be introduced to facilitate chemical sensitization. It is also recognized that silver halide may be epitaxially deposited at selected sites on a host grain to increase its sensitivity. For example, high chloride {100} tabular grains with corner epitaxy are illustrated by U.S. Pat. No. 5,275,930, incorporated herein by reference. For the purpose of providing a clear demarcation, the term "silver halide grain" is herein employed to include the silver used to form the grain up to the point that the final {100} crystal faces of the grain are formed. Silver halide later deposited that does not overlie the {100} crystal faces previously formed accounting for at least 50 percent of the grain surface area is excluded in determining total silver forming the silver halide grains. Thus, the silver forming selected site epitaxy is not part of the silver halide grains while silver halide that deposits and provides the final {100} crystal faces of the grains is included in the total silver forming the grains, even when it differs significantly in composition from the previously precipitated silver halide.

The emulsions can be spectrally sensitized with any of the dyes known to the photographic art, such as the polymethine dye class, which includes the cyanines, merocyanines, complex cyanines and merocyanines, oxonols, hemioxonols, styryls, merostyryls and streptocyanines. In particular, it would be advantageous to select from among the low staining sensitizing dyes disclosed in U.S. Pat. Nos. 5,292,634; 5,316,904; 5,418,126 and 5,492,802, incorporated herein by reference. Use of low staining sensitizing dyes in a photographic element processed in a developer solution with little or no optical brightening agent (for instance, stilbene compounds such as Blankophor REU®) is specifically contemplated. Further, these low staining dyes can be used in combination with other dyes known to the art (Research Disclosure, September 1996, Item 38957, Section V, incorporated herein by reference).

Emulsions can be spectrally sensitized with mixtures of two or more sensitizing dyes which form mixed dye aggregates on the surface of the emulsion grain. The use of mixed dye aggregates enables adjustment of the spectral sensitivity of the emulsion to any wavelength between the extremes of the wavelengths of peak sensitivities (X-max) of the two or more dyes. This practice is especially valuable if the two or more sensitizing dyes absorb in similar portions of the spectrum (i.e., blue, or green or red and not green plus red or blue plus red or green plus blue). Since the function of the spectral sensitizing dye is to modulate the information recorded in the negative which is recorded as an image dye, positioning the peak spectral sensitivity at or near the X-max of the image dye in the color negative produces the optimum preferred response. In addition, the combination of similarly spectrally sensitized emulsions can be in one or more layers.

An important quality characteristic of a reproductive film system is color reproduction, which represents how accurately the hues of the original scene are reproduced. Many current color papers use a blue sensitizing dye that gives a maximum sensitivity at about 480 nm. Use of a sensitizing dye that affords a sensitivity maximum that is closer to that of the yellow image dye in film, for instance with a sensitivity maximum of around 450-470 nm, can result in a color paper with improved color reproduction.

Typical of image dye-forming couplers that may be included in the invention element are couplers that form cyan dyes upon reaction with oxidized color developing agents which are described in such representative patents and publications as: U.S. Pat. Nos. 2,367,531; 2,423,730; 2,474,293; 2,772,162; 2,895,826; 3,002,836; 3,034,892; 3,041,236; 4,883,746 and "Farbkuppler-Eine Literature Ubersicht," published in Agfa Mitteilungen, Band III, pp. 156-175 (1961), all incorporated herein by reference. Preferably such couplers are phenols and naphthols that form cyan dyes on reaction with oxidized color developing agent. Also preferable are the cyan couplers described in, for instance, European Patent Application Nos. 491,197; 544,322; 556,700; 556,777; 565,096; 570,006; and 574,948, incorporated herein by reference.

Image dye-forming couplers may be included in the element such as couplers that form cyan dyes upon reaction with oxidized color developing agents which are described in such representative patents and publications as: U.S. Pat. Nos. 2,367,531; 2,423,730; 2,474,293; 2,772,162; 2,895,826; 3,002,836; 3,034,892; 3,041,236; 4,883,746 and "rFarbkuppler—Eine Literature Ubersicht," published in Agfa Mitteilungen, Band III, pp. 156-175 (1961), all incorporated herein by reference. Preferably such couplers are phenols and naphthols that form cyan dyes on reaction with oxidized color developing agent. Also preferable are the cyan couplers described in, for instance, European Patent Application Nos. 491,197; 544,322; 556,700; 556,777; 565,096; 570,006; and 574,948, incorporated herein by reference.

Typical cyan couplers are represented by the following formulas:

CYAN-1

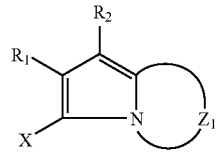

CYAN-2

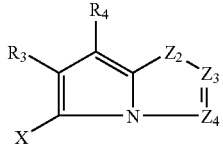

CYAN-3

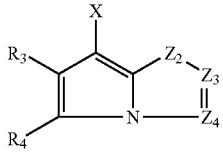

CYAN-4

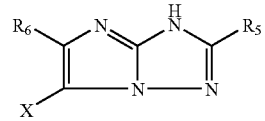

wherein $R_1$, $R_5$ and $R_8$ each represents a hydrogen or a substituent; $R_2$ represents a substituent; $R_3$, $R_4$ and $R_7$ each represents an electron attractive group having a Hammett's substituent constant $\sigma_{para}$ of 0.2 or more and the sum of the cypara values of $R_3$ and $R_4$ is 0.65 or more; $R_6$ represents an electron attractive group having a Hammett's substituent constant $\sigma_{para}$ of 0.35 or more; X represents a hydrogen or a coupling-off group; $Z_1$ represents nonmetallic atoms necessary for forming a nitrogen-containing, six-membered, heterocyclic ring which has at least one dissociative group; $Z_2$ represents —C($R_7$)═ and —N═; and $Z_3$ and $Z_4$ each represents —C($R_8$)═ and —N═.

Even more preferable are cyan couplers of the following formulas:

CYAN-5

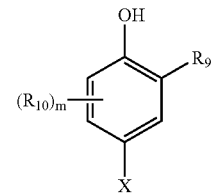

CYAN-6

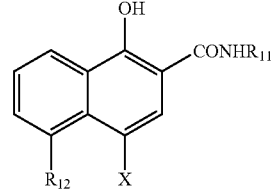

wherein $R_9$ represents a substituent (preferably a carbamoyl, ureido, or carbonamido group); $R_{10}$ represents a substituent (preferably individually selected from halogens, alkyl, and carbonamido groups); $R_{11}$ represents ballast substituent; $R_{12}$ represents a hydrogen or a substituent (preferably a carbonamido or sulphonamido group); X represents a hydrogen or a coupling-off group; and m is from 1-3.

A dissociative group has an acidic proton, for example, —NH—, —CH(R)—, that preferably has a pKa value of from 3 to 12 in water. Hammett's rule is an empirical rule proposed by L. P. Hammett in 1935 for the purpose of quantitatively discussing the influence of substituents on reactions or equilibria of a benzene derivative having the substituent thereon. This rule has become widely accepted. The values for Hammett's substituent constants may be found or measured as is described in the literature. For example, see C. Hansch and A. J. Leo, *J. Med. Chem.*, 16, 1207 (1973); *J. Med. Chem.*, 20, 304 (1977); and J. A. Dean, *Lange'S Handbook of Chemistry*, 12th Ed. (1979) (McGraw-Hill), incorporated herein by reference.

Another type of preferred cyan coupler is an "NB coupler" which is a dye-forming coupler which is capable of coupling with the developer 4-amino-3-methyl-N-ethyl-N-(2-methanesulfonamidoethyl) aniline sesquisulfate hydrate to form a dye for which the left bandwidth (LBW) of its absorption spectra upon "spin coating" of a 3% w/v solution of the dye in di-n-butyl sebacate solvent is at least 5 nm less than the LBW for a 3% w/v solution of the same dye in acetonitrile. The LBW of the spectral curve for a dye is the distance between the left side of the spectral curve and the wavelength of maximum absorption measured at a density of half the maximum.

The "spin coating" sample is prepared by first preparing a solution of the dye in di-n-butyl sebacate solvent (3% w/v). If the dye is insoluble, dissolution is achieved by the addition of some methylene chloride. The solution is filtered and 0.1-0.2 ml is applied to a clear polyethylene terephthalate support (approximately 4 cm×4 cm) and spun at 4,000 RPM using the Spin Coating equipment, Model No. EC101, available from Headway Research Inc., Garland TX. The transmission spectra of the so prepared dye samples are then recorded.

Preferred "NB couplers" form a dye which, in n-butyl sebacate, has a LBW of the absorption spectra upon "spin coating" which is at least 15 nm, preferably at least 25 nm, less than that of the same dye in a 3% solution (w/v) in acetonitrile.

A cyan dye-forming "NB coupler" which may be useful has the formula (IA)

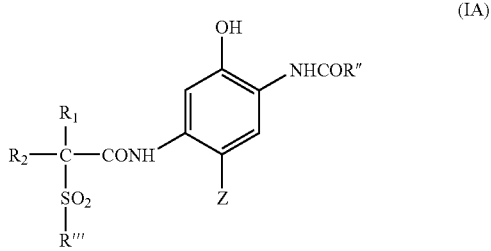

(IA)

wherein R' and R" are substituents selected such that the coupler is a "NB coupler", as herein defined; and Z is a hydrogen atom or a group which may be split off by the reaction of the coupler with an oxidized color developing agent.

The coupler of formula (IA) is a 2,5-diamido phenolic cyan coupler wherein the substituents R' and R" are preferably independently selected from unsubstituted or substituted alkyl, aryl, amino, alkoxy and heterocyclyl groups.

The "NB coupler" has the formula (I):

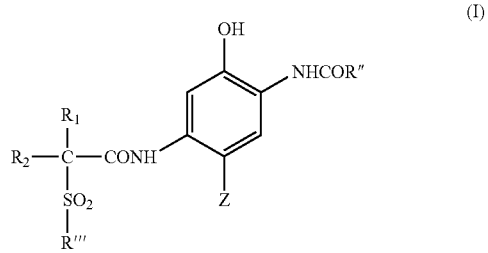

(I)

wherein R" and R'" are independently selected from unsubstituted or substituted alkyl, aryl, amino, alkoxy and heterocyclyl groups and Z is as hereinbefore defined; $R_1$ and $R_2$ are independently hydrogen or an unsubstituted or substituted alkyl group; and R" is an alkyl, amino or aryl group, suitably a phenyl group. R'" is desirably an alkyl or aryl group or a 5- to 10-membered heterocyclic ring which contains one or more heteroatoms selected from nitrogen, oxygen and sulfur, which ring group is unsubstituted or substituted.

In the preferred embodiment the coupler of formula (I) may be a 2,5-diamido phenol in which the 5-amido moiety is an amide of a carboxylic acid which is substituted in the alpha position by a particular sulfone (—$SO_2$—) group such as, for example, described in U.S. Pat. No. 5,686,235, incorporated herein by reference. The sulfone moiety is an unsubstituted or substituted alkylsulfone or a heterocyclyl sulfone or it is an arylsulfone, which is preferably substituted, in particular in the meta and/or para position.

Couplers having these structures of formulae (I) or (IA) comprise cyan dye-forming "NB couplers" which form image dyes having very sharp-cutting dye hues on the short wavelength side of the absorption curves with absorption maxima ($\lambda_{max}$) which are shifted hypsochromically and are generally from 620-645 nm, which is ideally suited for producing excellent color reproduction and high color saturation in color photographic papers.

Referring to formula (I), $R_1$ and $R_2$ are independently hydrogen or an unsubstituted or substituted alkyl group, preferably having from 1 to 24 carbon atoms and, in particular, 1 to 10 carbon atoms, suitably a methyl, ethyl, n-propyl, isopropyl, butyl or decyl group or an alkyl group substituted with one or more fluoro, chloro or bromo atoms, such as a trifluoromethyl group. Suitably, at least one of $R_1$ and $R_2$ is a hydrogen atom, and if only one of $R_1$ and $R_2$ is a hydrogen atom, then the other is preferably an alkyl group having 1 to 4 carbon atoms, more preferably 1 to 3 carbon atoms, and desirably two carbon atoms.

As used herein and throughout the specification unless where specifically stated otherwise, the term "alkyl" refers to an unsaturated or saturated straight or branched chain alkyl group, including alkenyl, and includes aralkyl and cyclic alkyl groups, including cycloalkenyl, having 3-8 carbon atoms and the term 'aryl' includes specifically fused aryl.

In formula (I), R" is suitably an unsubstituted or substituted amino, alkyl or aryl group or a 5- to 10-membered heterocyclic ring which contains one or more heteroatoms selected from nitrogen, oxygen and sulfur, which ring is unsubstituted or substituted, but is more suitably an unsubstituted or substituted phenyl group.

Examples of suitable substituent groups for this aryl or heterocyclic ring include cyano, chloro, fluoro, bromo, iodo, alkyl- or aryl-carbonyl alkyl- or aryl-oxycarbonyl, carbonamido, alkyl- or aryl-carbonamido, alkyl- or aryl-sulfonyl, alkyl- or aryl-sulfonyloxy, alkyl- or aryl-oxysulfonyl, alkylor aryl-sulfoxide, alkyl- or aryl-sulfamoyl, alkyl- or aryl-sulfonamido, aryl, alkyl, alkoxy, aryloxy, nitro, alkyl- or aryl-ureido and alkyl- or aryl-carbamoyl groups, any of which may be further substituted. Preferred groups are halogen, cyano, alkoxycarbonyl, alkylsulfamoyl, alkyl-sulfonamido, alkyl-sulfonyl, carbamoyl, alkylcarbamoyl or alkylcarbonamido. Suitably, R" is a 4-chlorophenyl, 3,4-di-chlorophenyl, 3,4-difluorophenyl, 4-cyanophenyl, 3-chloro-4-cyanophenyl, pentafluorophenyl, or a 3- or 4-sulfonamidophenyl group.

In formula (I) when R'" is alkyl, it may be unsubstituted or substituted with a substituent such as halogen or alkoxy. When R'" is aryl or a heterocycle, it may be substituted. Desirably, it is not substituted in the position alpha to the sulfonyl group.

In formula (I), when R'" is a phenyl group, it may be substituted in the meta and/or para positions with 1 to 3 substituents independently selected from the group consisting of halogen, and unsubstituted or substituted alkyl, alkoxy, aryloxy, acyloxy, acylamino, alkyl- or aryl-sulfonyloxy, alkyl- or aryl-sulfamoyl, alkyl- or aryl-sulfamoylamino, alkyl- or aryl-sulfonamido, alkyl- or aryl-ureido, alkyl- or aryl-oxycarbonyl, alkyl- or aryl-oxy-carbonylamino and alkyl- or aryl-carbamoyl groups.

In particular, each substituent may be an alkyl group such as methyl, t-butyl, heptyl, dodecyl, pentadecyl, octadecyl or 1,1,2,2-tetramethylpropyl; an alkoxy group such as methoxy, t-butoxy, octyloxy, dodecyloxy, tetradecyloxy, hexadecyloxy or octadecyloxy; an aryloxy group such as phenoxy, 4-t-butylphenoxy or 4-dodecyl-phenoxy; an alkyl- or aryl-acyloxy group such as acetoxy or dodecanoyloxy; an alkyl- or aryl-acylamino group such as acetamido, hexadecanamido or benzamido; an alkyl- or aryl-sulfonyloxy group such as methyl-sulfonyloxy, dodecylsulfonyloxy or 4-methylphenyl-sulfonyloxy; an alkyl- or aryl-sulfamoyl-group such as N-butylsulfamoyl or N-4-t-butylphenylsulfamoyl; an alkyl- or aryl-sulfamoylamino group such as N-butyl-sulfamoylamino or N-4-t-butylphenylsulfamoyl-amino; an alkyl- or aryl-sulfonamido group such as methane-sulfonamido, hexadecane-sulfonamido or 4-chlorophenyl-sulfonamido; an alkyl- or aryl-ureido group such as methylureido or phenylureido; an alkoxy- or aryloxy-carbonyl such as methoxycarbonyl or phenoxycarbonyl; an alkoxy- or aryloxy-carbonylamino group such as methoxy-carbonylamino or phenoxycarbonylamino; an alkyl- or aryl-carbamoyl group such as N-butyl-carbamoyl or N-methyl-N-dodecylcarbamoyl; or a perfluoroalkyl group such as trifluoromethyl or heptafluoropropyl.

Suitably, the above substituent groups have 1 to 30 carbon atoms, more preferably 8 to 20 aliphatic carbon atoms. A desirable substituent is an alkyl group of 12 to 18 aliphatic carbon atoms such as dodecyl, pentadecyl or octadecyl or an alkoxy group with 8 to 18 aliphatic carbon atoms such as dodecyloxy and hexadecyloxy or a halogen such as a meta or para chloro group, carboxy or sulfonamido. Any such groups may contain interrupting heteroatoms such as oxygen to form for example polyalkylene oxides.

In formula (I) or (IA), Z is a hydrogen atom or a group which may be split off by the reaction of the coupler with an oxidized color developing agent, known in the photographic art as a 'coupling-off group' and may preferably be hydrogen, chloro, fluoro, substituted aryloxy or mercaptotetrazole, more preferably hydrogen or chloro.

The presence or absence of such groups determines the chemical equivalency of the coupler, that is, whether it is a 2-equivalent or 4-equivalent coupler, and its particular identity may modify the reactivity of the coupler. Such groups may advantageously affect the layer in which the coupler is coated, or other layers in the photographic recording material by performing, after release from the coupler, functions such as dye formation, dye hue adjustment, development acceleration or inhibition, bleach acceleration or inhibition, electron transfer facilitation, color correction.

Representative classes of such coupling-off groups include, for example, halogen, alkoxy, aryloxy, heterocyclyloxy, sulfonyloxy, acyloxy, acyl, heterocyclylsulfonamido, heterocyclylthio, benzothiazolyl, phosophonyloxy, alkylthio, arylthio, and arylazo. These coupling-off groups are described in the art, for example, in U.S. Pat. Nos. 2,455,169; 3,227,551; 3,432,521; 3,467,563; 3,617,291; 3,880,661; 4,052,212; and 4,134,766; and in U.K. Patent Nos. and published applications 1,466,728; 1,531,927; 1,533,039; 2,066,755A, and 2,017,704A, all incorporated herein by reference. Halogen, alkoxy, and aryloxy groups are most suitable.

Examples of specific coupling-off groups are —Cl, —F, —Br, —SCN, —OCH$_3$, —OC6H5, —OCH$_2$C(=O)NHCH$_2$CH$_2$OH, —OCH$_2$C(O)NHCH$_2$CH$_2$OCH$_3$, —OCH$_2$C(O)NHCH$_2$CH$_2$OC(=O)OCH$_3$, —P(=O)(OC2H5)$_2$, —SCH$_2$CH$_2$COOH,

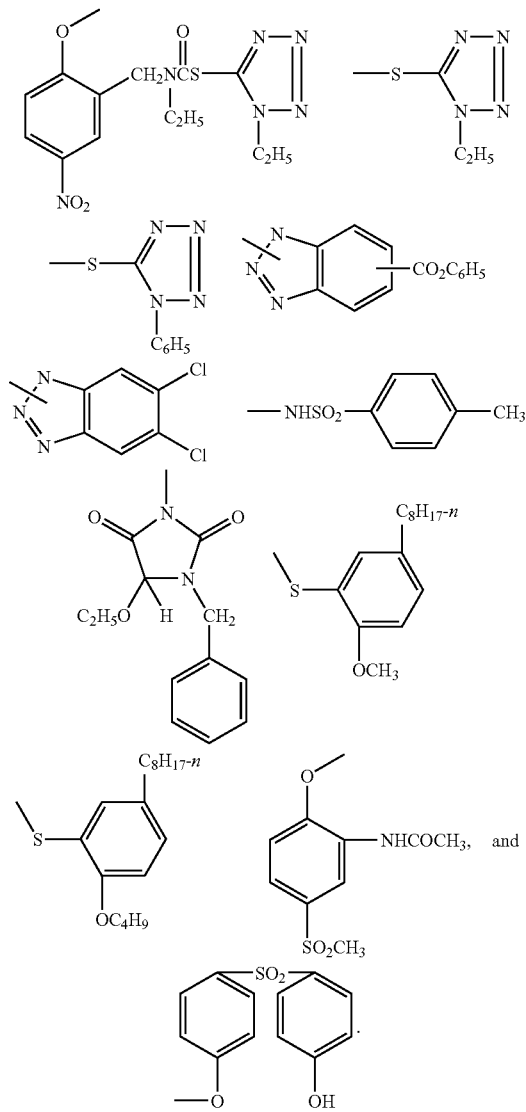

Typically, the coupling-off group is a chlorine atom, hydrogen atom, or p-methoxyphenoxy group.

It is essential that the substituent groups be selected so as to adequately ballast the coupler and the resulting dye in the organic solvent in which the coupler is dispersed. The ballasting may be accomplished by providing hydrophobic substituent groups in one or more of the substituent groups. Generally a ballast group is an organic radical of such size and configuration as to confer on the coupler molecule sufficient bulk and aqueous insolubility as to render the coupler substantially nondiffusible from the layer in which it is coated in a photographic element. Thus, the combination of substituents are suitably chosen to meet these criteria. To be effective, the ballast will usually contain at least 8 carbon atoms and typically contains 10 to 30 carbon atoms. Suitable ballasting may also be accomplished by providing a plurality of groups which, in combination, meet these criteria. In the preferred embodiments, $R_1$ in formula (I) is a small alkyl group or hydrogen. Therefore, in these embodiments the ballast would be primarily located as part of the other groups. Furthermore, even if the coupling-off group Z contains a ballast, it is often desirable to ballast the other substituents as well, since Z is eliminated from the molecule upon coupling; thus, the ballast is most advantageously provided as part of groups other than Z.

Couplers that form magenta dyes upon reaction with oxidized color developing agent are described in such representative patents and publications as: U.S. Pat. Nos. 2,311,082; 2,343,703; 2,369,489; 2,600,788; 2,908,573; 3,062,653; 3,152,896; 3,519,429; 3,758,309; and "Farbkuppler-eine Literature Ubersicht," published in Agfa Mitteilungen, Band III, pp. 126-156 (1961), all incorporated herein by reference. Preferably such couplers are pyrazolones, pyrazolotriazoles, or pyrazolobenzimidazoles that form magenta dyes upon reaction with oxidized color developing agents. Especially preferred couplers are 1H-pyrazolo[5,1-c]-1,2,4-triazole and 1H-pyrazolo[1,5-b]-1,2,4-triazole. Examples of 1H-pyrazolo [5,1-c]-1,2,4-triazole couplers are described in U.K. Patent Nos. 1,247,493; 1,252,418; 1,398,979; U.S. Pat. Nos. 4,443, 536; 4,514,490; 4,540,654; 4,590,153; 4,665,015; 4,822,730; 4,945,034; 5,017,465; and 5,023,170. Examples of 1H-pyrazolo[1,5-b]-1,2,4-triazoles may be found in European Patent applications 176,804; 177,765; U.S. Pat. Nos. 4,659,652; 5,066,575; and 5,250,400, all incorporated herein by reference.

Typical pyrazoloazole and pyrazolone couplers are represented by the following formulas:

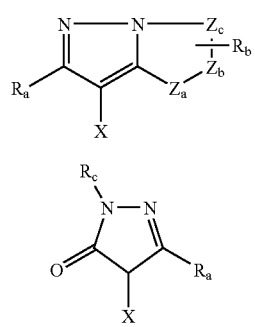

MAGENTA-1

MAGENTA-2 wherein $R_a$ and $R_b$ independently represent H or a substituent; $R_c$ is a substituent (preferably an aryl group); $R_d$ is a substituent (preferably an anilino, carbonamido, ureido, carbamoyl, alkoxy, aryloxycarbonyl, alkoxycarbonyl, or N-heterocyclic group); X is hydrogen or a coupling-off group; and $Z_a$, $Z_b$, and $Z_c$ are independently a substituted methine group, =N—, =C—, or —NH—, provided that one of either the $Z_a$—$Z_b$ bond or the $Z_b$—$Z_c$ bond is a double bond and the other is a single bond, and when the $Z_b$—$Z_c$ bond is a carbon-carbon double bond, it may form part of an aromatic ring, and at least one of $Z_a$, $Z_b$, and $Z_c$ represents a methine group connected to the group $R_b$.

Specific examples of such couplers are:

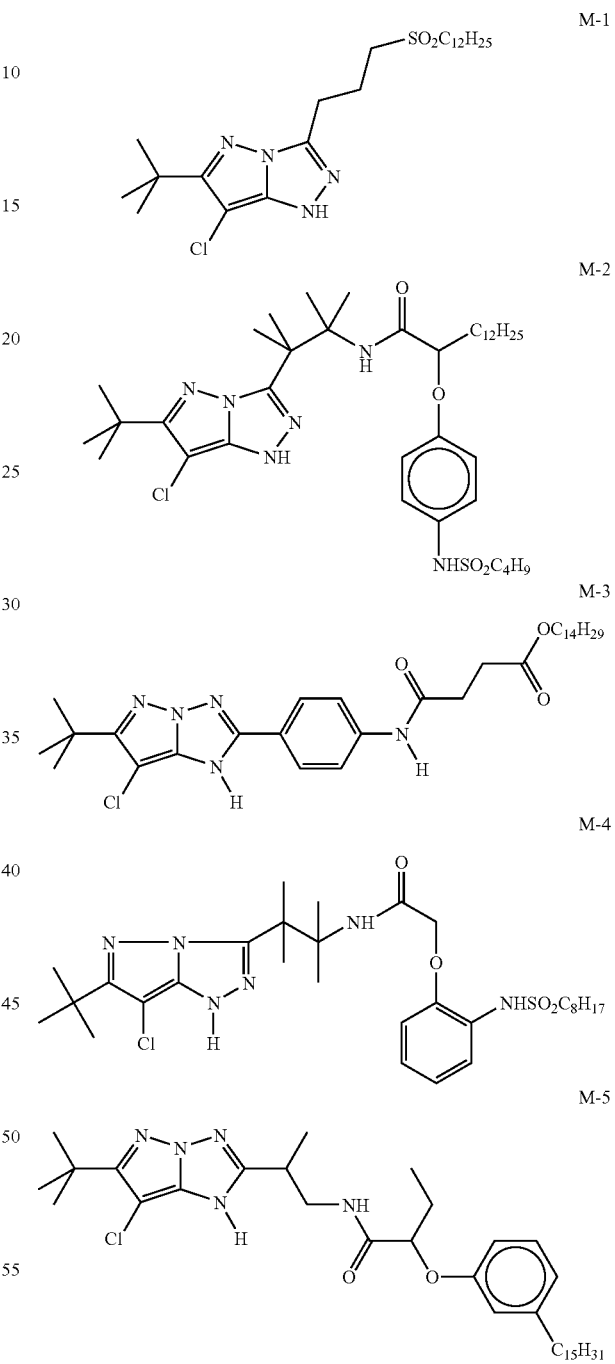

Couplers that form yellow dyes upon reaction with oxidized color developing agent are described in such representative patents and publications as: U.S. Pat. Nos. 2,298,443; 2,407,210; 2,875,057; 3,048,194; 3,265,506; 3,447,928; 3,960,570; 4,022,620; 4,443,536; 4,910,126; and 5,340,703 and "Farbkuppler-eine Literature Ubersicht," published in Agfa Mitteilungen, Band III, pp. 112-126 (1961), incorporated herein by reference. Such couplers are typically open chain ketomethylene compounds. Also preferred are yellow couplers such as described in, for example, European Patent Application Nos. 482,552; 510,535; 524,540; 543,367; and U.S. Pat. No. 5,238,803, incorporated herein by reference. For improved color reproduction, couplers which give yellow dyes that cut off sharply on the long wavelength side are particularly preferred (for example, see U.S. Pat. No. 5,360,713, incorporated herein by reference).

Typical preferred yellow couplers are represented by the following formulas:

YELLOW-1

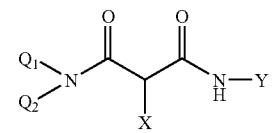

YELLOW-2

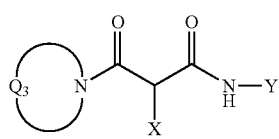

YELLOW-3

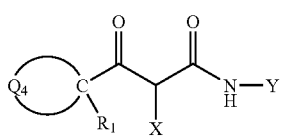

YELLOW-4

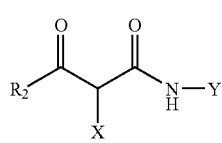

wherein $R_1$, $R_2$, $Q_1$ and $Q_2$ each represents a substituent; X is hydrogen or a coupling-off group; Y represents an aryl group or a heterocyclic group; $Q_3$ represents an organic residue required to form a nitrogen-containing heterocyclic group together with the >N—; and $Q_4$ represents nonmetallic atoms necessary to from a 3- to 5-membered hydrocarbon ring or a 3- to 5-membered heterocyclic ring which contains at least one hetero atom selected from N, O, S, and P in the ring. Particularly preferred is when $Q_1$ and $Q_2$ each represents an alkyl group, an aryl group, or a heterocyclic group, and $R_2$ represents an aryl or tertiary alkyl group.

Preferred yellow couplers may be of the following general structures:

Y-1

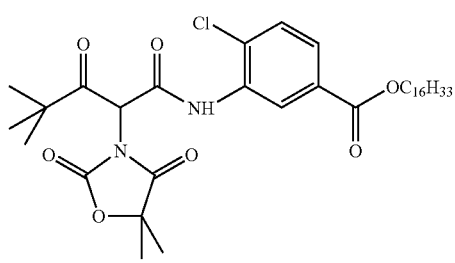

Y-2

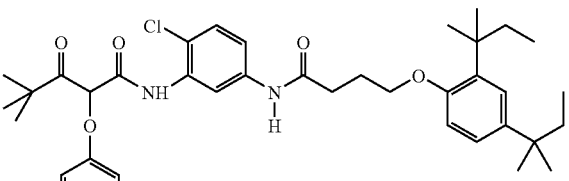

Y-3

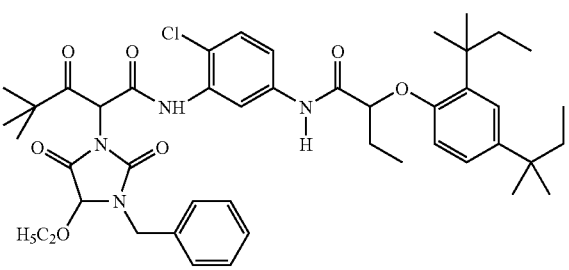

Y-4

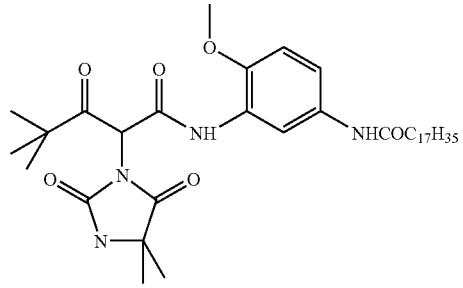

Y-5

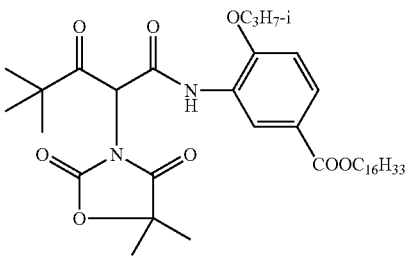

Y-6

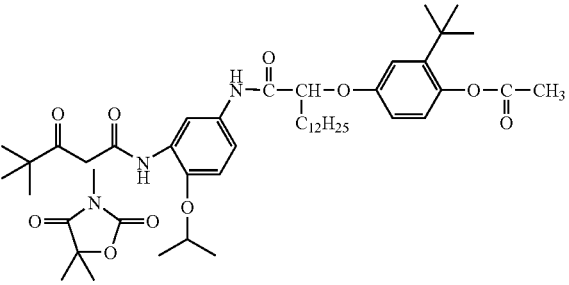

Unless otherwise specifically stated, substituent groups which may be substituted on molecules herein include any groups, whether substituted or unsubstituted, which do not destroy properties necessary for photographic utility. When the term "group" is applied to the identification of a substituent containing a substitutable hydrogen, it is intended to encompass not only the substituent's unsubstituted form, but also its form further substituted with any group or groups as herein mentioned. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecyl-phenylcarbonylamino, p-toluoylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluoylureido, N-(m-hexadecylphenyl) ureido, N,N-(2,5-di-t-pentylphenyl)-NI-ethylureido, and t-butylcarbonamido; sulfonamido, such as methylsulfonamido, benzenesulfonamido, p-toluoylsulfonamido, p-dodecylbenzenesulfonamido, N-methyltetradecylsulfonamido, N,N-dipropyl-sulfarnoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl, methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluoylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluoylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amino, such as phenylanilino, 2-chloroanilino, diethylamino, dodecylamino; imino, such as 1 (N-phenylimido)ethyl, N-succinimido or 3-benzylhydantoinyl;

phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3- to 7-membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired photographic properties for a specific application and may include, for example, hydrophobic groups, solubilizing groups, blocking groups, releasing or releasable groups. Generally, the above groups and substituents thereof may include those having up to 48 carbon atoms, typically 1 to 36 carbon atoms and usually less than 24 carbon atoms, but greater numbers are possible depending on the particular substituents selected.

Representative substituents on ballast groups include alkyl, aryl, alkoxy, aryloxy, alkylthio, hydroxy, halogen, alkoxycarbonyl, aryloxycarbonyl, carboxy, acyl, acyloxy, amino, anilino, carbonamido, carbamoyl, alkylsulfonyl, arylsulfonyl, sulfonamido, and sulfamoyl groups wherein the substituents typically contain 1 to 42 carbon atoms. Such substituents may also be further substituted.

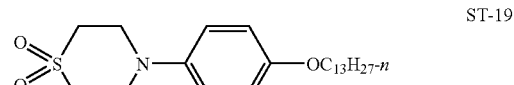

ST-19

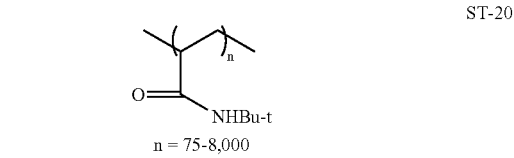

ST-20

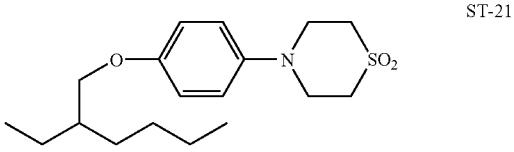

ST-21

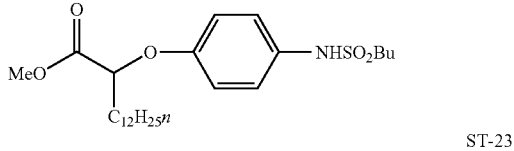

ST-22

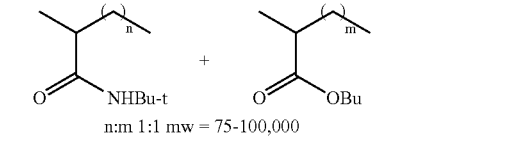

ST-23

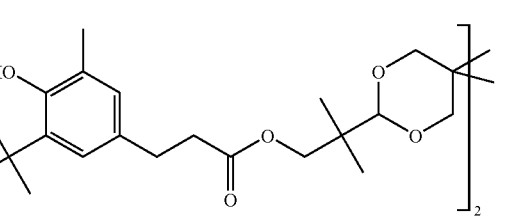

ST-24

-continued

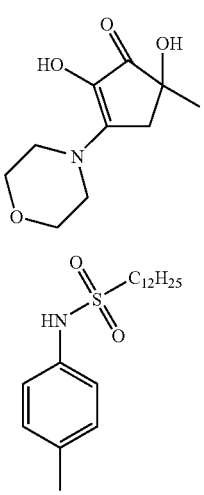

ST-25

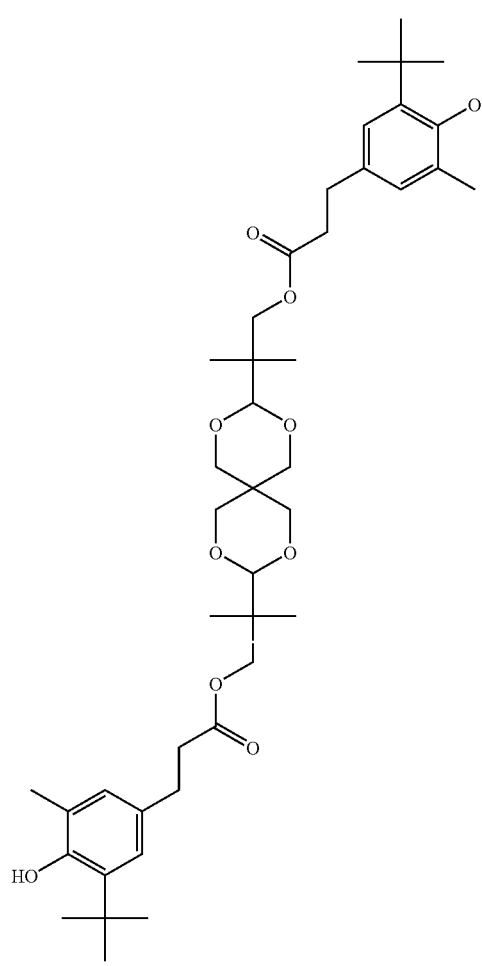

ST-26

ST-27

Examples of solvents which may be used include tritolyl phosphate, dibutyl phthalate, diundecyl phthalate, N,N-diethyldodecanamide, N,N-dibutyldodecanamide, tris(2-ethylhexyl)phosphate, acetyl tributyl citrate, 2,4-di-tert-pentylphenol, 2-(2-butoxyethoxy)ethyl acetate, 1,4-cyclohexyldimethylene bis(2-ethylhexanoate), decanedioic acid, dibutyl esterthe.

The dispersions and overcoat layers used in photographic elements may also include ultraviolet (UV) stabilizers and so-called liquid UV stabilizers such as described in U.S. Pat. Nos. 4,992,358; 4,975,360; and 4,587,346, incorporated herein by reference. Preferred are the polymeric UV agents, when used in the overcoat layer. PUV-1, PUV-2, and PUV-3 are preferred for use in the overcoat, as they provide excellent UV protection at low amounts. Polymeric UV agents in the overcoat may be combined with non-polymeric UV agents in interlayers and dye-forming layer. A UV absorber may also be included in the cyan layer or in a layer above the dye-forming layers. A layer between the surface SOC layer and the upper image forming layer may also be effective UV control. The placement of UV absorbers in the upper surface protective layer (SOC layer) is also useful, as they are most effective in this layer and a separate overlayer coating is not required.

The aqueous phase may include surfactants. Surfactant may be cationic, anionic, zwitterionic or non-ionic. Useful surfactants include, but are not limited to, those disclosed in U.S. Pat. Nos. 5,558,980 (col. 33) and 5,594,047 (col. 28-29), incorporated herein by reference.

Further, it is contemplated to stabilize photographic dispersions prone to particle growth through the use of hydrophobic, photographically inert compounds such as disclosed by Zengerle et al U.S. Pat. No. 5,468,604, incorporated herein by reference.

The photographic elements may also contain filter dye layers comprising colloidal silver sol or yellow, cyan, and/or magenta filter dyes, either as oil-in-water dispersions, latex dispersions or as solid particle dispersions. Useful examples of absorbing materials are discussed in Research Disclosure, September 1996, Item 38957, Section VIII.

The photographic elements may also contain light absorbing materials that can increase sharpness and be used to control speed and minimum density. Examples of useful absorber dyes are described in U.S. Pat. No. 4,877,721, U.S. Pat. No. 5,001,043, U.S. Pat. No. 5,153,108, and U.S. Pat. No. 5,035,985, all incorporated herein by reference. Solid particle dispersion dyes are described in U.S. Pat. Nos. 4,803,150; 4,855,221; 4,857,446; 4,900,652; 4,900,653; 4,940,654; 4,948,717; 4,948,718; 4,950,586; 4,988,611; 4,994,356; 5,098,820; 5,213,956; 5,260,179; 5,266,454, all incorporated herein by reference. A preferred absorber dye is 1,4-Benzenedisulfonic acid, 2-(3-acetyl-4-(5-(3-acetyl-1-(2,5-disulfophenyl)-1,5-dihydro-5-oxo-4H-pyrazol-4-ylidene)-3-((dimethylamino)carbonyl)-1,3-pentadienyl)-5-hydroxy-1H-pyrazol-1-yl)-, pentasodium salt. Other useful absorber dyes include, but are not limited to, the following structures.

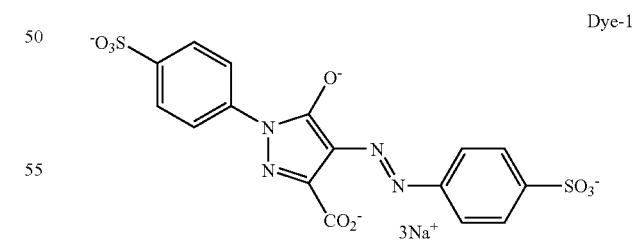

Dye-1

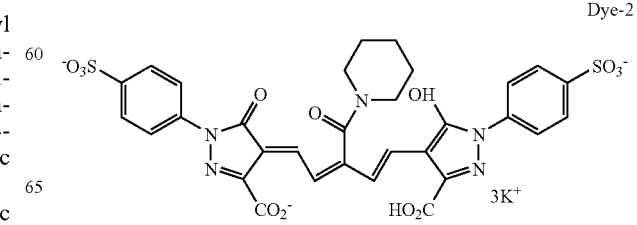

Dye-2

-continued

Dye-3

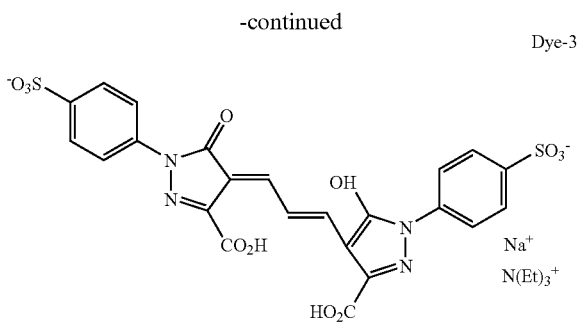

A preferred embodiment may employ recording elements which are constructed to contain at least three silver halide emulsions and preferably eight layer units. A suitable full color, multilayer format for a recording element is represented by Structure I.

STRUCTURE I

Overcoat

UV Layer Containing UV light-absorbing materials
Red-sensitized cyan dye image-forming silver halide emulsion unit
Interlayer Green-sensitized magenta dye image-forming silver halide emulsion unit
Interlayer Blue-sensitized yellow dye image-forming silver halide emulsion unit
///// Support /////

The image-forming units are separated from each other by hydrophilic colloid interlayers containing an oxidized developing agent scavenger to prevent color contamination. Silver halide emulsions satisfying the grain and gelatino-peptizer requirements described above may be present in any one or combination of the emulsion layer units. Additional useful multicolor, multilayer formats for an element include structures as described in U.S. Pat. No. 5,783,373, incorporated herein by reference. Each of such structures would contain silver halide emulsions comprised of high chloride grains having at least 50 percent of their surface area bounded by {100} crystal faces and containing dopants from classes (i) and (ii), as described above. Preferably each of the emulsion layer units contains emulsion satisfying these criteria. Any of the emulsion containing layers, interlayers or the support may optionally contain colorants (tints).

Conventional features that may be incorporated into multilayer (and particularly multicolor) recording elements contemplated for use in the invention are illustrated by *Research Disclosure*, Item 38957, incorporated herein by reference, cited above: XI. Layers and layer arrangements; XII. Features applicable only to color negative; XIII. Features applicable only to color positive; B. Color reversal; C. Color positives derived from color negatives; XIV. Scan facilitating features.

The recording elements comprising the radiation sensitive high chloride emulsion layers may be conventionally optically printed, or may be image-wise exposed in a pixel-by-pixel mode using suitable high energy radiation sources typically employed in electronic printing methods. Suitable actinic forms of energy encompass the ultraviolet, visible, and infrared regions of the electromagnetic spectrum, as well as electron-beam radiation and are conveniently supplied by beams from one or more light emitting diodes or lasers, including gaseous or solid state lasers. Exposures may be monochromatic, orthochromatic, or panchromatic. For example, when the recording element is a multilayer multicolor element, exposure may be provided by laser or light emitting diode beams of appropriate spectral radiation, for example, infrared, red, green or blue wavelengths, to which such element is sensitive. Multicolor elements may be employed which produce cyan, magenta and yellow dyes as a function of exposure in separate portions of the electromagnetic spectrum, including at least two portions of the infrared region, as disclosed in the previously mentioned U.S. Pat. No. 4,619,892, incorporated herein by reference. Suitable exposures include those up to 2000 nm, preferably up to 1500 nm. Suitable light emitting diodes and commercially available laser sources are known and commercially available. Imagewise exposures at ambient, elevated, or reduced temperatures and/or pressures may be employed within the useful response range of the recording element determined by conventional sensitometric techniques, as illustrated by T. H. James, *The Theory of the Photographic Process*, 4th Ed., Macmillan, 1977, Chapters 4, 6, 17, 18, and 23, incorporated herein by reference.

It has been observed that anionic $[MX_xY_yL_z]$ hexacoordination complexes, where M is a group 8 or 9 metal (preferably iron, ruthenium or iridium), X is halide or pseudohalide (preferably Cl, Br, or CN) x is 3 to 5, Y is $H_2O$, y is 0 or 1, L is a C—C, H—C or C—N—H organic ligand, and Z is 1 or 2, are surprisingly effective in reducing high intensity reciprocity failure (HIRF), low intensity reciprocity failure (LIRF) and thermal sensitivity variance and in an improving latent image keeping (LIK). As herein employed, HIRF is a measure of the variance of photographic properties for equal exposures, but with exposure times ranging from $10^{-1}$ to $10^{-6}$ second. LIRF is a measure of the variance of photographic properties for equal exposures, but with exposure times ranging from $10^{-1}$ to 500 seconds. Although these advantages may be generally compatible with face centered cubic lattice grain structures, the most striking improvements have been observed in high (>50 mole %, preferably ≧90 mole %) chloride emulsions. Preferred C—C, H—C, or C—N—H organic ligands are aromatic heterocycles of the type described in U.S. Pat. No. 5,462,849, incorporated herein by reference. The most effective C—C, H—C, or C—N—H organic ligands are azoles and azines, either unsubstituted or containing alkyl, alkoxy, or halide substituents, where the alkyl moieties contain from 1 to 8 carbon atoms. Particularly preferred azoles and azines include thiazoles, thiazolines, and pyrazines.

The quantity or level of high energy actinic radiation provided to the recording medium by the exposure source is generally at least $10^{-7}$ ergs/cm$^2$, typically from $10^{-4}$ ergs/cm$^2$ to $10^{-3}$ ergs/cm$^2$ and often from $10^{-3}$ ergs/cm$^2$ to $10^2$ ergs/cm$^2$. Exposure of the recording element in a pixel-by-pixel mode as known in the prior art persists for only a very short duration or time. Typical maximum exposure times are up to 100µ seconds, often up to 10µ seconds, and frequently up to only 0.5µ seconds. Single or multiple exposures of each pixel are contemplated. The pixel density is subject to wide variation, as is obvious to those skilled in the art. The higher the pixel density, the sharper the images may be, but at the expense of equipment complexity. In general, pixel densities used in conventional electronic printing methods of the type described herein do not exceed $10^7$ pixels/cm and are typically from $10^4$ to $10^6$ pixels/cm$^2$. An assessment of the technology of high-quality, continuous-tone, color electronic printing using silver halide photographic paper which discusses various features and components of the system, including exposure source, exposure time, exposure level and pixel density and other recording element characteristics is provided in Firth et al., *A Continuous-Tone Laser Color Printer*, Journal of Imaging Technology, Vol. 14, No. 3, June 1988, incorporated herein by reference. As previously indicated herein, a description of some of the details of conventional electronic printing methods comprising scanning a recording element with high energy beams such as light emitting diodes or laser beams, is set forth in Hioki U.S. Pat. No. 5,126,235 and European Patent Applications 479 167 A1 and 502 508 A1, all incorporated herein by reference.

Once imagewise exposed, the recording elements may be processed in any convenient conventional manner to obtain a viewable image. Such processing is illustrated by *Research Disclosure*, Item 38957, cited above: XVIII. Chemical development systems; XIX. Development; XX. Desilvering, washing, rinsing, and stabilizing.

In addition, a useful developer for the inventive material is a homogeneous, single-part developing agent. The homogeneous, single-part color developing concentrate is prepared using a sequence of steps:

In the first step, an aqueous solution of a suitable color developing agent is prepared. This color developing agent is generally in the form of a sulfate salt. Other components of the solution may include an antioxidant for the color developing agent, a suitable number of alkali metal ions (in an at least stoichiometric proportion to the sulfate ions) provided by an alkali metal base, and a photographically inactive water-miscible or water-soluble hydroxy-containing organic solvent. This solvent is present in the final concentrate at a concentration such that the weight ratio of water to the organic solvent is from 15:85 to 50:50.

In this environment, especially at high alkalinity, alkali metal ions and sulfate ions form a sulfate salt that is precipitated in the presence of the hydroxy-containing organic solvent. The precipitated sulfate salt may then be readily removed using any suitable liquid/solid phase separation technique (including filtration, centrifugation, or decantation). If the antioxidant is a liquid organic compound, two phases may be formed and the precipitate may be removed by discarding the aqueous phase.

The color developing concentrates include one or more color developing agents that are well known in the art that, in oxidized form, will react with dye-forming color couplers in the processed materials. Such color developing agents include, but are not limited to, aminophenols, p-phenylenediamines (especially N,N-dialkyl-p-phenylenediamines) and others which are well known in the art, such as EP 0 434 097 A1 (published Jun. 26, 1991) and EP 0 530 921 A1 (published Mar. 10, 1993), incorporated herein by reference. It may be useful for the color developing agents to have one or more water-solubilizing groups as are known in the art. Further details of such materials are provided in *Research Disclosure*, 38957, pages 592-639 (September 1996), incorporated herein by reference. *Research Disclosure* is a publication of Kenneth Mason Publications Ltd., Dudley House, 12 North Street, Emsworth, Hampshire PO10 7DQ England (also available from Emsworth Design Inc., 121 West 19th Street, New York, N.Y. 10011). This reference will be referred to hereinafter as "*Research Disclosure*".

Preferred color developing agents include, but are not limited to, N,N-diethyl p-phenylenediamine sulfate (KODAK Color Developing Agent CD-2), 4-amino-3-methyl-N-(2-methane sulfonamidoethyl)aniline sulfate, 4-(N-ethyl-N-σ-hydroxyethylamino)-2-methylaniline sulfate (KODAK Color Developing Agent CD-4), phydroxyethylethylaminoaniline sulfate, 4-(N-ethyl-N-2-methanesulfonylaminoethyl)-2-methylphenylenediamine sesquisulfate (KODAK Color Developing Agent CD-3), 4-(N-ethyl-N-2-methanesulfonylaminoethyl)-2-methylphenylenediamine sesquisulfate, and others readily apparent to one skilled in the art.

In order to protect the color developing agents from oxidation, one or more antioxidants are generally included in the color developing compositions. Either inorganic or organic antioxidants may be used. Many classes of useful antioxidants are known, including but not limited to, sulfites (such as sodium sulfite, potassium sulfite, sodium bisulfite and potassium metabisulfite), hydroxylamine (and derivatives thereof), hydrazines, hydrazides, amino acids, ascorbic acid (and derivatives thereof), hydroxamic acids, aminoketones, mono- and polysaccharides, mono- and polyamines, quaternary ammonium salts, nitroxy radicals, alcohols, and oximes. Also useful as antioxidants are 1,4-cyclohexadiones. Mixtures of compounds from the same or different classes of antioxidants may also be used if desired.

Especially useful antioxidants are hydroxylamine derivatives as described, for example, in U.S. Pat. Nos. 4,892,804; 4,876,174; 5,354,646; and 5,660,974, all noted above, and U.S. Pat. No. 5,646,327 (Burns et al), incorporated herein by reference. Many of these antioxidants are mono- and dialkylhydroxylamines having one or more substituents on one or both alkyl groups. Particularly useful alkyl substituents include sulfo, carboxy, amino, sulfonamido, carbonamido, hydroxy, and other solubilizing substituents.

More preferably, the noted hydroxylamine derivatives may be mono- or dialkylhydroxylamines having one or more hydroxy substituents on the one or more alkyl groups. Representative compounds of this type are described, for example, in U.S. Pat. No. 5,709,982 (Marrese et al), incorporated herein by reference, as having the structure AI:

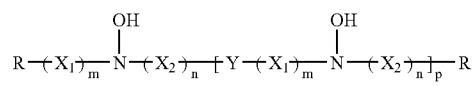

wherein R is hydrogen, a substituted or unsubstituted alkyl group of 1 to 10 carbon atoms, a substituted or unsubstituted hydroxyalkyl group of 1 to 10 carbon atoms, a substituted or unsubstituted cycloalkyl group of 5 to 10 carbon atoms, or a substituted or unsubstituted aryl group having 6 to 10 carbon atoms in the aromatic nucleus.

$X_1$ is —$CR_2(OH)CHR_1$— and $X_2$ is —$CHRICR_2(OH)$— wherein $R_1$ and $R_2$ are independently hydrogen, hydroxy, a substituted or unsubstituted alkyl group or 1 or 2 carbon atoms, a substituted or unsubstituted hydroxyalkyl group of 1 or 2 carbon atoms, or $R_1$ and $R_2$ together represent the carbon atoms necessary to complete a substituted or unsubstituted 5- to 8-membered saturated or unsaturated carbocyclic ring structure.

Y is a substituted or unsubstituted alkylene group having at least 4 carbon atoms, and has an even number of carbon atoms, or Y is a substituted or unsubstituted divalent aliphatic group having an even total number of carbon and oxygen atoms in the chain, provided that the aliphatic group has a least 4 atoms in the chain.

Also in Structure AI, m, n, and p are independently 0 or 1. Preferably, each of m and n is 1, and p is 0, Specific disubstituted hydroxylamine antioxidants include, but are not limited to, N,N-bis(2,3-dihydroxypropyl)-hydroxylamine, N,N-bis(2-methyl-2,3-dihydroxypropyl)hydroxylamine, and N,N-bis(1-hydroxymethyl-2-hydroxy-3-phenylpropyl)hydroxylamine. The first compound is preferred.

In the following Table, reference will be made to (1) *Research Disclosure*, December 1978, Item 17643, (2) *Research Disclosure*, December 1989, Item 308119, and (3) *Research Disclosure*, September 1994, Item 36544, all published by Kenneth Mason Publications, Ltd., Dudley Annex, 12a North Street, Emsworth, Hampshire PO10 7DQ, ENGLAND, incorporated herein by reference. The Table and the references cited in the Table are to be read as describing particular components suitable for use with the invention. The Table and its cited references also describe suitable ways of preparing, exposing, processing and manipulating the elements, and the images contained therein.

| Reference: Section | Subject Matter |
|---|---|
| 1: I, II | Grain composition, morphology and preparation. Emulsion preparation including hardeners, coating aids, addenda |
| 2: I, II, IX, X, XI, XII, IV, XV, I, II, III, IX | |
| 3: A & B | |
| 1: III, IV | Chemical sensitization and spectral sensitization/Desensitization |
| 2: III, IV | |
| 3: IV, V | |
| 1: V | UV dyes, optical brighteners, luminescent dyes |
| 2: V | |
| 3: VI | |
| 1: VI | |
| 2: VI | Antifoggants and stabilizers |
| 3: VII | |
| 1: VIII | Absorbing and scattering materials; Antistatic layers; matting agents |
| 2: VIII, XIII, XVI | |
| 3: VIII, IX C & D | |
| 1: VII | Image-couplers and image-modifying couplers; Dye stabilizers and hue modifiers |
| 2: VII | |
| 3: X | |
| 1: XVII | Supports |
| 2: XVII | |
| 3: XV | |
| 3: XI | Specific layer arrangements |
| 3: XII, XIII | Negative working emulsions; Direct positive emulsions |
| 2: XVII | Exposure |
| 3: XVI | |
| 1: XIX, XX | Chemical processing; Developing agents |
| 2: XIX, XX, XXII | |
| 3: XVIII, XIX, XX | |
| 3: XIV | Scanning & digital processing procedures |

The photographic elements may be exposed with various forms of energy which encompass the ultraviolet, visible, and infrared regions of the electromagnetic spectrum, as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they may include features found in conventional radiographic element.

This allows for traditional image processing equipment to be used. The imaging elements may be exposed via traditional optical methods using a negative, but they are preferably exposed by means of a collimated beam, to form a latent image, and then processed to form a visible image, preferably by other than heat treatment. A collimated beam is preferred as it allows for digital printing and simultaneous exposure of the imaging layer on the top and bottom side without significant internal light scatter. A preferred example of a collimated beam is a laser also known as light amplification by stimulated emission of radiation. The laser may be preferred because this technology is used widely in a number of digital printing equipment types. Further, the laser provides sufficient energy to simultaneously expose the light sensitive silver halide coating on the top and bottom side of the display material without undesirable light scatter. Subsequent processing of the latent image into a visible image is preferably carried out in the known RA-4™ (Eastman Kodak Company) process or other processing systems suitable for developing high chloride emulsions.

EXAMPLES

The support for the examples was prepared by applying the experimental, comparison or control face-side coatings to a paper base with a back-side coating of unpigmented polyethylene. The unpigmented polyethylene coating on back (wire side) consists of high density polyethylene/low density polyethylene (HDPE/LDPE) blend at a 65/35 ratio. The HDPE resin used was a 8 melt flow rate (ASTM D1238) Chevron Phillips PE9608 (density is 962 kg/r$^3$) and LDPE resin used was a LDPE 5004I (Dow Chemical Co.) that has a density is 924 kg/m$^3$ and melt flow rate (ASTM D1238). Resin coverages were approximately 27 g/m$^2$.

A 0.0635 m single screw extruder was used along with a 0.0254 m single screw extruder to create the structures. All the structures were coated on emulsion side of the paper, which had a wire side coating of 65% HDPE 9608 and 35% LDPE D4002P. For all structures the DDAAA feedplug was used.

The photographic paper raw base was made using a standard fourdrinier paper machine utilizing a blend of mostly bleached hardwood Kraft fibers. The fiber ratio consisted primarily of bleached poplar (38%) and maple/beech (37%) with lesser amounts of birch (18%) and softwood (7%). Acid sizing chemical addenda, utilized on a dry weight basis, included an aluminum stearate size at 0.85% addition, polyaminoamide epichlorhydrin at 0.68% addition, and polyacrylamide resin at 0.24% addition. Titanium dioxide filler was used at 0.60% addition. Surface sizing using hydroxyethylated starch and sodium bicarbonate was also employed.

In the present invention, the pearlescence was found to be enhanced based on the surface characteristics (roughness) of the chill roll surface against which the pearlescent pigment layer was extruded. To highlight the effect of chill roll surface on nacreous appearance, face side coatings containing nacreous pigment were made against three chill roll surfaces. These chill rolls differ in Ra, Rz and Rmax. Of the chill rolls, chill roll B has highest Ra, Rz and Rmax. Chill roll C has lowest Ra, Rz and R max and is known in the trade as glossy chill roll. Chill rolls A and B are rougher than Chill roll C and result in resin coated products having low gloss and texture or topography due to roughness associated with it. The characteristics of the chill roll surfaces were measured using a profilometer and are shown in Table 1.

TABLE 1

| Chill roll characteristics | | | |
|---|---|---|---|
| Chill Roll | Ra (μm) | Rz (μm) | Rmax (μm) |
| A | 1.143 | 7.976 | 9.618 |
| B | 2.005 | 11.125 | 13.229 |
| C (glossy) | 0.132 | 1.174 | 1.323 |

The nacreous pigment used for the face side coatings was Magnapearl 3100 (Engelhard) which is a mica pigment with a rutile TiO2 coating. The particle size of Magnapearl 3100 is 2 μm to 10 μm. The Magnapearl 3100 was obtained in a masterbatch form dispersed in LDPE matrix resin at 25 weight % loading. It was let down in LDPE 5004I (Dow Chemical Co.) which has a density is 924 kg/m$^3$ and melt flow rate (ASTM D1238) of 4.15. This enabled creation of face side resin compositions containing different amounts of nacreous pigment.

FLOP was characterized using a spectrophotogoniometer. For each sample FLOP was characterized in the machine direction and cross direction, at least at three different locations on the sample. The values reported here are average FLOP values, which is similar to what the human eye would perceive.

Surface roughness of the image receiving side of each sample was measured using a Mahr Perthometer Concept stylus profilometer instrumented with a skidless 2 μm radius probe. Each sample was characterized for roughness in 10-15 locations, and the trace direction was perpendicular to the machine direction. The measurement and analysis was carried out as per ASME B.46.1-2002 Standard (classification and designation of surface qualities). Filtering of profiles was performed by employing a roughness long wavelength cutoff of 0.8 mm to 2.5 mm; and a roughness short wavelength cutoff of 2.5 μm.

Opacity was measured according to ASTM method E308-96, specular reflectance was included, and the testing was done by measuring one sheet black by black and then black by white (Baryta). Colorimetry was measured on an UltraScan XE Colorimeter made by Hunter Associates Laboratory using D 6500 light source without UV (UVO) light excitation of the sample.

Surprisingly it was found that, when resin containing nacreous pigment was extruded against chill roll B, it gave significantly higher FLOP values than when resin was extruded against chill roll. Furthermore, it was found that resin containing nacreous pigment can replace existing scattering agents or opacifiers, like $TiO_2$, used to create imaging supports and provide dual functionality, opacity and nacreous appearance as characterized by FLOP values.

The experiments will highlight effect of surface roughness of chill rolls, will highlight the effect of layer ratio of pearlescent layer to the non-pearlescent layer and will highlight use of a monolayer of pearlescent pigment, along with tints in emulsion layer.

Effect of Chill Roll

Example 1

Control 1 (Using Chill Roll A, Monolayer Coating)

73% LDPE 50041 (Dow Chemical Co.) was physically blended with 22% 110LT127 and fed into the extruder. The 110LT127 resin (a masterbatch of $TiO_2$) contains 52.141% D4002P LDPE (Dow Chemical Co.), 46.66% Dupont R-101 $TiO_2$, 0.7% zinc stearate as lubricant, and also has optical brightener 0.02% Hostalux KS-K and process stabilizer 0.04% Irganox 1076 in it. The 110LT127 resin does not contain any colorants. The resin was melted in the extruder and fed to a die and was extrusion coated on the paper at 244 fpm. The resin was rapidly quenched against chill roll A. A resin coated roll was made with a coating resin coverage of 24.41 $gm/m^2$. The coating was a monolayer coating containing 10.27 wt % R-101 $TiO_2$. Resin coated samples were drawn from the roll evaluated for FLOP while the rest of the roll was sensitized (imaging layers applied) and characterized for surface roughness and FLOP.

Example 2

Control 2 (Using Chill Roll B, Monolayer Coating)

73% LDPE 5004 (Dow Chemical Co.) was physically blended with 22% 110LT127 and fed into the extruder. The resin was melted in the extruder and fed to a die and was extrusion coated on the paper at 200 fpm. The resin was rapidly quenched against chill roll B. The coating coverage of the resin was 24.41 $gm/m^2$ and it was a monolayer coating. Resin coated samples were drawn from the roll evaluated for FLOP while the rest of the roll was sensitized (imaging layers applied) and characterized for surface roughness and FLOP.

Example 3

Comparative 3 (Coextruded Resin Coating Layer Using Chill Roll A)

A coextruded coating of Magnapearl masterbatch coated along with 110LT127 was created in a 4:1 layer ratio on the face side of the paper at 244 fpm. The total overall resin coverage was 23.44 $gm/m^2$ and it was rapidly quenched against chill roll A. The layer containing the Magnapearl pigment was closest to the emulsion (image receiving) layer and was the thicker layer. The Magnapearl masterbatch was let down in LDPE 5004I (Dow Chemical Co.) to result in 5 weight (wt.) % of the pigment while 110LT127 was blended with LDPE5004 in 35 wt % to 65 wt % ratio to result in $TiO_2$ content of 16.33 wt %. Resin coated samples were drawn from the roll and evaluated for FLOP while the rest of the roll was sensitized and characterized for roughness and FLOP.

Example 4

Coextruded Resin Coating Layer Using Chill Roll B (Inventive Example)

A coextruded coating of Magnapearl masterbatch coated along with 110LT127 was created in a 4:1 layer ratio on the face side of the paper at 244 fpm. The total overall resin coverage was 24.9 $gm/m^2$ and it was rapidly quenched against chill roll B. The layer containing the Magnapearl pigment was closest to the emulsion (image receiving) layer and was the thicker layer. The Magnapearl masterbatch was let down in LDPE 50041 (Dow Chemical Co.) to result in 5 weight (wt.) % of the pigment while 110LT127 was blended with LDPE 5004I in 35 wt % to 65 wt % ratio to result in $TiO_2$ content of 16.33 wt % in the thinner layer. Resin coated samples were drawn from the roll and evaluated for FLOP while the rest of the roll was sensitized and characterized for roughness and FLOP.

Example 5

Coextruded Resin Coating Layer Using Chill Roll A (Comparative Example)

A coextruded coating of Magnapearl masterbatch coated along with 110LT127 was created in a 4:1 layer ratio on the face side of the paper at 244 fpm. The total overall resin coverage was 23.44 $gm/m^2$ and it was rapidly quenched against chill roll A. The layer containing the Magnapearl pigment was closest to the emulsion (image receiving) layer and was the thicker layer. The Magnapearl masterbatch was let down in LDPE 50041 to result in 7.5 weight (wt.) % of the pigment while 110LT127 was blended with LDPE5004 in 35 wt % to 65 wt % ratio to result in $TiO_2$ content of 16.33 wt % in the thinner layer. Resin coated samples were drawn from the roll and evaluated for FLOP while the rest of the roll was sensitized and characterized for roughness and FLOP.

Example 6

Coextruded Resin Coating Layer Using Chill Roll B (Invention)

A coextruded coating of Magnapearl masterbatch coated along with 110LT127 was created in a 4:1 layer ratio on the face side of the paper at 260 fpm. The total overall resin coverage was 24.9 $gm/m^2$ and it was rapidly quenched against chill roll B. The layer containing the Magnapearl pigment was closest to the emulsion (image receiving) layer and was the thicker layer. The Magnapearl masterbatch was let down in LDPE 50041 to result in 7.5 weight (wt.) % of the pigment while 110LT127 was blended with LDPE5004 in 35 wt % to 65 wt % ratio to result in $TiO_2$ content of 16.33 wt % in the thinner layer. Resin coated samples were drawn from the roll and evaluated for FLOP while the rest of the roll was sensitized and characterized for roughness and FLOP.

Example 7

Coextruded Resin Coating Layer Using Chill Roll A (Comparative Example)

A coextruded coating of Magnapearl masterbatch coated along with 110LT127 was created in a 4:1 layer ratio on the face side of the paper at 244 fpm. The total overall resin coverage was 25.39 gm/m$^2$ and it was rapidly quenched against chill roll A. The layer containing the Magnapearl pigment was closest to the emulsion (image receiving) layer and was the thicker layer. The Magnapearl masterbatch was let down in LDPE 50041 to result in weight (wt.) % of the pigment while 110LT127 was blended with LDPE5004 in 35 wt % to 65 wt % ratio to result in TiO$_2$ content of 16.33 wt % in the thinner layer. Resin coated samples were drawn from the roll and evaluated for FLOP while the rest of the roll was sensitized and characterized for roughness and FLOP.

Example 8

Coextruded Resin Coating Layer Using Chill Roll B (Invention)

A coextruded coating of Magnapearl masterbatch coated along with 110LT127 was created in a 4:1 layer ratio on the face side of the paper at 258 fpm. The total overall resin coverage was 24.9 gm/m$^2$ and it was rapidly quenched against chill roll B. The layer containing the Magnapearl pigment was closest to the emulsion (image receiving) layer and was the thicker layer. The Magnapearl masterbatch was let down in LDPE 50041 to result in 10 weight (wt.) % of the pigment while 110LT127 was blended with LDPE5004 in 35 wt % to 65 wt % ratio to result in TiO$_2$ content of 16.33 wt % in the thinner layer. Resin coated samples were drawn from the roll and evaluated for FLOP while the rest of the roll was sensitized and characterized for roughness and FLOP.

Table 2 compares the average FLOP value of Examples 1-8. It is observed that increasing the thickness of the layer containing the nacreous pigment increases the average FLOP value. Furthermore, increasing the nacreous pigment content for a given layer ratio increases the average FLOP value. The most important observation from the Examples is that chill roll characteristics played an important role in determining average FLOP value. It was very surprisingly found that using chill roll B, the rougher chill roll, increased the average FLOP value (see examples 3, 5, 7 versus 4, 6, 8). For equivalent layer ratios or near equivalent nacreous pigment content, the FLOP value was dependent on chill roll surface characteristics.

TABLE 2

Effect of chill roll, MagnaPearl (nacreous) pigment content on FLOP value

| Sample I.D. | Overall coating coverage | Layer Ratio (Magnapearl layer: R-101 TiO$_2$ layer) | Magnapearl (Nacreous) Pigment wt % | Chill Roll | Average FLOP Value |
|---|---|---|---|---|---|
| 1 (control) (contains R-101 TiO$_2$) | 5 | 0:1 (monolayer) | 0 | A | 3.69 |
| 2 (control) (contains R-101 TiO$_2$) | 5 | 0:1 (monolayer) | 0 | B | 8.12 |
| 3 (comparison) | 4.8 | 4:1 (coextruded) | 5 | A | 14.98 |
| 4 (Invention) | 5.1 | 4:1 (coextruded) | 5 | B | 30.15 |
| 5 (comparison) | 4.8 | 4:1 (coextruded) | 7.5 | A | 16.45 |
| 6 (Invention) | 5.1 | 4:1 (coextruded) | 7.5 | B | 36.58 |
| 7 (comparison) | 5.2 | 4:1 | 10 | A | 19.25 |
| 8 (Invention) | 5.1 | 4:1 | 10 | B | 38.44 |

Table 3 compares the roughness characteristics of the imaging element (resin coated support with imaging layers) to the average FLOP value of Examples 1-8. It is observed that the chill roll surface characteristics affect the final imaging element surface topography. It was observed that examples created using chill roll B (rougher chill roll as characterized by Ra, Rz and Rmax) result in a rougher resin coated surface and thus a rougher imaging element surface. Examples created using rougher chill roll B had a higher FLOP value, which is very surprising, as literature has always indicated that a smoother surface provides a higher FLOP value. To obtain high FLOP values while having a rough uppermost surface, it is necessary to have a high Sm, less number of peaks/cm which are of size greater than 0.25 μm but less than 1 μm.

TABLE 3

Roughness characteristics of resin coated surface & average FLOP value

| Sample I.D. | Chill Roll | Ra of imaging element (support with emulsion) surface (μm) | rz of imaging element (support with emulsion) surface (μm) | Sm (μm) | Peaks/cm >0.25 μm, but <1 μm | Peaks/cm >1 micron, but <3 microns | Average FLOP Value |
|---|---|---|---|---|---|---|---|
| 1 (control) | A | 0.561 | 3.285 | 97.9 | 219 | 90 | 3.69 |
| 2 (control) | B | 1.532 | 8.168 | 289.3 | 41 | 63 | 8.12 |
| 3 (comparison) | A | 0.52 | 3.136 | 96.9 | 218 | 88 | 14.98 |
| 4 (invention) | B | 1.584 | 8.712 | 331.9 | 40 | 61 | 30.15 |
| 5 (comparison) | A | 0.578 | 3.406 | 97.5 | 223.8 | 90 | 16.45 |
| 6 (invention) | B | 1.583 | 8.506 | 308 | 41 | 60 | 36.58 |
| 7 (comparison) | A | 0.517 | 3.147 | 99.2 | 215 | 83 | 19.25 |
| 8 (invention) | B | 1.527 | 8.458 | 309 | 40 | 62 | 38.44 |

Example 9

Invention

A monolayer coating of Magnapearl was created when the Magnapearl masterbatch was let down in LDPE 50041 to result in 10 weight 10 (wt %) of the pigment. The resin was melted in the extruder and fed to a die and was extrusion coated on the paper at 275 fpm. The resin was rapidly quenched against chill roll B. The coating coverage was 24.41 gm/m$^2$ and it was a monolayer coating. This example does not use any R-101 TiO2 which is used in creating resin coated supports for imaging applications like in Examples 1 and 2.

Resin coated samples were drawn from the roll and evaluated for FLOP while the rest of the roll was sensitized and characterized for roughness and FLOP.

Example 10

Invention

A monolayer coating of Magnapearl was created when the Magnapearl masterbatch was let down in LDPE 5004I to result in 10 weight (wt %) of the pigment. The resin was melted in the extruder and fed to a die and was extrusion coated on the paper at 230 fpm. The resin was rapidly quenched against chill roll B. The coating coverage was 29.78 gm/m$^2$ and it was a monolayer coating. This example does not use any R-101 TiO2 which is used in creating resin coated supports for imaging applications like in Examples 1 and 2.

Example 11

Invention

A monolayer coating of Magnapearl was created when Magnapearl masterbatch was let down in LDPE 5004I to result in 10 weight (wt %) of the pigment. The resin was melted in the extruder and fed to a die and was extrusion coated on the paper at 198 μm. The resin was rapidly quenched against chill roll B. The coating coverage was 34.67 gm/m$^2$ and it was a monolayer coating. This example does not use any R-101 TiO2 which is used in creating resin coated supports for imaging applications like in Examples 1 and 2.

Table 4 shows the effect of layer ratio of nacreous pigment to R-101 TiO2 on opacity and FLOP. All the samples were created using chill roll B. It was observed that monolayers of Maganpearl (nacreous) pigment gave nearly equivalent average FLOP value to coextruded structures created with Magnapearl layer and R-101 layer (see examples 8 and 9). Furthermore, replacing all the R-101 TiO2 contained in 110LT127 masterbatch with the nacreous pigment, produces imaging supports of equivalent opacity, which is an important feature for imaging supports. It is possible to replace the traditionally used TiO2 (Example 1 and 2) with an nacreous pigment specifically and obtain imaging supports which have imaging supports requirements like opacity as well as an unique appearance, as determined by FLOP. In monolayer formats, optimization for opacity, FLOP, as well as cost can be carried out.

TABLE 4

Effect of layer ratio on opacity and FLOP value. Chill roll used was chill roll B

| Sample I.D. | Overall coating coverage | Layer Ratio (Magnapearl layer: R-101 layer) | Magnapearl (Nacreous) Pigment wt % | Opacity | Average FLOP Value |
|---|---|---|---|---|---|
| 2 (control) (contains R-101 TiO2) | 5 | 0:1 (monolayer) | 0 | 93.49 | 8.12 |
| 8 (invention) | 5 | 4:1 | 10 | 94.73 | 38.44 |
| 9 (invention) | 5 | 1:0 (monolayer) | 10 | 94.33 | 39.48 |
| 10 (invention) | 6.1 | 1:0 (monolayer) | 10 | 94.88 | 41.54 |
| 11 (invention) | 7.1 | 1:0 (monolayer) | 10 | 95.13 | 42.05 |

A further advantage of this use of nacreous pigment is the ability to eliminate colorants in the resin coated layer and adjust colorimetry of the entire support using colorants in the emulsion layer closest to the resin coated layer. See Table 5.

TABLE 5

Colorimetry

| | Prior to Sensitizing | | | After Sensitizing with colorants in the emulsion layers | | |
|---|---|---|---|---|---|---|
| Sample I.D. | L*UVO | a*UVO | b*UVO | L*UVO | a*UVO | b*UVO |
| 2 (control) | 95.27 | −0.39 | 0.14 | 90.73 | −0.16 | −3.51 |
| 8 (invention) | 94.57 | −0.22 | 1.47 | 91.31 | −0.16 | −1.38 |
| 9 (invention) | 94.24 | −0.25 | 1.53 | 90.88 | −0.19 | −1.53 |

Example 12

Coextruded Resin Coating Layer Using Chill Roll B (Invention)

A coextruded coating of Magnapearl masterbatch coated along with masterbatch 11643-08 was created in a 3:2 layer ratio on the face side of the paper at 243 fpm. The total overall resin coverage was 25.39 gm/m$^2$ and it was rapidly quenched against chill roll B. The layer containing the Magnapearl pigment was closest to the emulsion (image receiving) layer and was the thicker layer. The Magnapearl masterbatch was let down in LDPE 5004I to result in 10 weight (wt.) % of the pigment while 11643-08 was blended with LDPE5004 in 35 wt % to 65 wt % ratio to result in TiO$_2$ content of 16.33 wt % in the thinner layer. Resin coated samples were drawn from the roll and evaluated for FLOP while the rest of the roll was sensitized and characterized for FLOP.

Example 13

Coextruded Resin Coating Layer Using Chill Roll C (Glossy)

A coextruded coating of Magnapearl masterbatch coated along with masterbatch 11643-08 was created in a 3:2 layer ratio on the face side of the paper at 244 μm. The total overall resin coverage was 25.39 gm/m$^2$ and it was rapidly quenched against chill roll B. The layer containing the Magnapearl pigment was closest to the emulsion (image receiving) layer and was the thicker layer. The Magnapearl masterbatch was let down in LDPE 5004I to result in 10 weight (wt.) % of the pigment while 11643-08 was blended with LDPE5004 in 35 wt % to 65 wt % A ratio to result in TiO$_2$ content of 16.33 wt % in the thinner layer. Resin coated samples were drawn from the roll and evaluated for FLOP while the rest of the roll was sensitized and characterized for roughness and FLOP.

Table 6 compares the change in average FLOP values of resin coated samples containing nacreous pigment with respect to internal control samples not containing nacreous pigment. It is observed that samples created against a rough chill roll, Chill roll B has a greater change in FLOP value than samples created using chill roll C which is known in the art as a glossy chill roll.

TABLE 6

| Sample I.D | Chill Roll | Ra of imaging element (support with imaging layers) surface (μm) | Rz of imaging element (support with imaging layers) (μm) | Sm (μm) | Peaks/cm >0.25 μm, but <1 μm | Change of Average FLOP Value w.r.t. control |
|---|---|---|---|---|---|---|
| 12 (invention) | B | Not measured | Not measured | Not measured | Not measured | 34.82 |
| 13 | C | 0.139 | 0.823 | 65.1 | 56 | 28.42 |

Summarized, the experimental data above support the finding that a support provides the desired FLOP value when the uppermost layer has a surface roughness average Ra of greater than 0.8 μm and a roughness characteristic Rz of greater than 7 μm, especially when this is combined with a spatial surface characterizing parameter Sm of greater than 150 μm. Particularly, an imaging element wherein the uppermost layer has a surface roughness average Ra of greater than 1.5 μm and a roughness characteristic Rz of greater than 8.4 μm provided FLOP values greater than 25, typically greater than 30. This is especially supported when the uppermost layer has a spatial surface characterizing parameter Sm of greater than 290 μm.

The invention has been described in detail with particular reference to certain preferred embodiments thereof, but it will be understood that variations and modifications can be effected within the spirit and scope of the invention.

The invention claimed is:

1. An imaging element comprising at least one imaging layer and a support, wherein the support comprises at least one nacreous resin layer, wherein the uppermost layer of said support is adjacent to said at least one imaging layer and comprises nacreous pigment in a polyolefin matrix polymer, and wherein the FLOP value of said imaging element is greater than 25.

2. The imaging element of claim 1 wherein said uppermost layer has a surface roughness average Ra of greater than 0.8 μm and a roughness characteristic Rz of greater than 7 μm.

3. The imaging element of claim 2 wherein said uppermost layer has a spatial surface characterizing parameter Sm of greater than 150 μm.

4. The imaging element of claim 1 wherein said uppermost layer has a surface with from 30-70 peaks/cm>than 0.25 μm but <1 μm.

5. The imaging element of claim 1 wherein said uppermost layer has a surface roughness average Ra of greater than 1.5 μm and a roughness characteristic Rz of greater than 8.4 μm.

6. The imaging element of claim 5 wherein said uppermost layer has a spatial surface characterizing parameter Sm of greater than 290 μm.

7. The imaging element of claim 1 wherein said uppermost layer is free of non-nacreous inorganic pigment.

8. The imaging element of claim 1 wherein said uppermost layer is an extruded layer.

9. The imaging element of claim 1 wherein said nacreous pigment comprises elongated platelet-like structures of silicate-based materials.

10. The imaging element of claim 1 wherein said nacreous pigment is mica coated with metal oxides.

11. The imaging element of claim 10 wherein said mica coated with metal oxides is mica coated with titanium dioxide.

12. The imaging element of claim 1 wherein said nacreous pigment is present in an amount of from 0.1 to 15% by weight.

13. The imaging element of claim 1 wherein said polyolefin matrix polymer is polyethylene.

14. The imaging element of claim 13 wherein said polyethylene is low density polyethylene.

15. The imaging element of claim 1 wherein said imaging layer is a silver halide imaging layer.

16. The imaging element of claim 1 wherein said imaging layer is a swellable inkjet imaging layer.

17. The imaging element of claim 1 wherein said support comprises exactly one nacreous resin coated layer on a base substrate.

18. The imaging element of claim 1 wherein said support further comprises at least one pigmented layer on the side of said uppermost layer opposite the side adjacent to said at least one imaging layer.

19. The imaging element of claim 18 wherein said at least one pigmented layer comprises titanium dioxide.

20. The imaging element of claim 18 wherein the ratio of the thickness of said at least one nacreous resin layer to the thickness of said pigmented layer is 4:1.

21. The imaging element of claim 1 further comprising a base substrate on the side of said uppermost layer opposite the side adjacent to said at least one imaging layer.

22. A support for an imaging element comprising at least one nacreous resin layer, wherein the uppermost layer of said support comprises nacreous pigment in a polyolefin matrix polymer, and wherein the FLOP value of said support is greater than 25.

23. The support of claim 22 wherein said uppermost layer has a surface roughness average Ra of greater than 0.8 μm and a roughness characteristic Rz of greater than 7 μm.

24. A method of making a support comprising:
providing a base substrate;
extruding a molten uppermost layer comprising nacreous pigment in a polyolefin matrix polymer;
contacting said molten uppermost layer with a chill roll having a surface that has a roughness average (Ra) of 2 μm, and Rz of 11.125 μm; and
removing the uppermost layer from said chill roll, wherein the FLOP value of said uppermost layer is greater than 25.

25. The method of claim 24 wherein said uppermost layer has a surface with from 30-70 peaks/cm>than 0.25 μm but <1 μm.

* * * * *